(12) United States Patent
Lozhkin et al.

(10) Patent No.: US 7,376,196 B2
(45) Date of Patent: May 20, 2008

(54) RECEIVING APPARATUS IN COMMUNICATION SYSTEM

(75) Inventors: Alexander N. Lozhkin, Kawasaki (JP); Yoshinori Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 241 days.

(21) Appl. No.: 11/280,445

(22) Filed: Nov. 16, 2005

(65) Prior Publication Data
US 2006/0067447 A1    Mar. 30, 2006

Related U.S. Application Data

(63) Continuation of application No. PCT/JP03/09561, filed on Jul. 29, 2003.

(51) Int. Cl.
*H04K 1/00* (2006.01)
*H04L 23/02* (2006.01)
(52) U.S. Cl. .................. 375/265; 375/260; 375/262
(58) Field of Classification Search ........... 375/260, 375/262, 265, 285, 324, 340, 341, 346, 147; 370/281, 344, 464; 714/792, 794, 795, 786
See application file for complete search history.

(56) References Cited

U.S. PATENT DOCUMENTS

| | | | | |
|---|---|---|---|---|
| 4,739,401 A * | 4/1988 | Sacks et al. | ............... | 382/103 |
| 6,226,321 B1 * | 5/2001 | Michels et al. | ............ | 375/227 |
| 6,304,996 B1 * | 10/2001 | Van Stralen et al. | ........ | 714/796 |
| 6,771,723 B1 * | 8/2004 | Davis et al. | ................ | 375/350 |
| 2003/0026028 A1 * | 2/2003 | Ichihara et al. | ............... | 360/65 |

FOREIGN PATENT DOCUMENTS

| | | |
|---|---|---|
| JP | 10-4391 | 1/1998 |
| JP | 2001-217724 | 8/2001 |
| JP | 2003-069531 | 3/2003 |
| JP | 2003-124907 | 4/2003 |

OTHER PUBLICATIONS

International Search Report dated Nov. 4, 2003.

* cited by examiner

*Primary Examiner*—David C. Payne
*Assistant Examiner*—Linda Wong
(74) *Attorney, Agent, or Firm*—Katten Muchin Rosenman LLP

(57) ABSTRACT

In a receiving apparatus in a multicarrier communication system for transmitting data independently via a plurality of subchannels, (1) a soft-decision target value $lnD_0$ is calculated, this being the difference between the probability that data received from a subchannel of interest is one of two values and the probability that the data is the other of the two values; (2) a non-linear operation is performed using degrees of coupling $\alpha_1$, $\alpha_2$ with other subchannels and soft-decision target values $lnD_1$, $lnD_2$ that have entered from receivers on the other channels, and the soft-decision target value $lnD_0$ on the subchannel of interest is adjusted subchannel by subchannel based upon results of the non-linear operation; and (3) a decision is rendered on receive data based upon the soft-decision target value that has been adjusted.

10 Claims, 11 Drawing Sheets

$$F(x, \Delta E) = \ln \cosh\left\{\frac{x - \Delta E}{2}\right\} - \ln \cosh\left\{\frac{x + \Delta E}{2}\right\}$$

RECEIVING APPARATUS IN COMMUNICATION SYSTEM

CROSS-REFERENCE TO RELATED APPLICATION

This application is a continuation of International Application PCT/JP03/09561 filed on Jul. 29, 2003, now pending, the contents of which are herein wholly incorporated by reference.

BACKGROUND OF THE INVENTION

This invention relates to a receiving apparatus in a communication system employing DMT modulation or filter bank modulation, etc. such as a communication system having several subchannels or a multicarrier communication system. More particularly, the invention relates to a receiving apparatus in a communication system that is based upon a maximum a posteriori probability estimation algorithm in which soft-decision target values that have been derived from a plurality of subchannels are employed to refine a soft-decision target value on a subchannel of interest.

Bit error rate (BER) in filter bank modulation, DMT modulation and FMT modulation, etc. multicarrier communication systems can be improved by utilizing a receive signal that contains distortion owing to inter-channel interference (ICI). ICI is produced by system malfunction or an unavoidable environment (e.g., loss of orthogonality between subchannels ascribable to frequency offset or the like) in a communication system, e.g., in OFDM-CDMA. ICI is caused by leakage of spectral energy and sometimes by leakage between subchannels referred to as crosstalk.

The main advantage of a turbo receiver in the present invention is that the behavior of ICI is handled as a zero-average Gaussian distribution probability variable (e.g., a Gaussian approximation used in non-patent reference K. Sathananthan and C. Tellambura, "Probability of error calculation of OFDM system with frequency offset", IEEE Trans. Commun. Vol. 49, No. 11, Nov. 2001, pp. 1884-1888) and employs a finite-state discrete Markov process model. With such an ICI model, it appears that a simple Gaussian approximation is more realistic in view of the nature of ICI.

A turbo receiver according to the present invention is based upon a maximum a posteriori probability estimation algorithm. With this turbo receiver, information that has been derived from a plurality of subchannels after non-linear processing is employed to refine the estimated maximum a posteriori probability (soft-decision target value) of a subchannel of interest.

(a) Relationship between frequency offset and ICI

In a multicarrier communication system in which a band is split into a plurality of subbands, which are independent narrow bands, and transmit data is frequency-multiplexed subband by subband, sent and received, i.e., in a multicarrier communication system employing filter bank modulation, DMT modulation or FMT modulation, etc., selection of a filter set has traditionally been executed under the constraint that inter-symbol interference (ISI) and inter-channel interference (ICI) be completely eliminated.

In the case of an ideal transmission channel on which there is no Doppler shift, no offset frequency between transceivers and no occurrence of signal distortion, the above constraint assures error-free restoration of transmission symbols at the receiver. However, a frequency offset produced on each channel by inaccurate tuning of an oscillator or by a Doppler shift gives rise to a decline in BER ascribable to spectral leakage or ICI (non-patent reference K. Sathananthan and C. Tellambura, "Probability of error calculation of OFDM system with frequency offset", IEEE Trans. Commun. Vol. 49, No. 11, Nov. 2001, pp. 1884-1888).

The only method of mitigating such a decline in BER is to make the frequency offset as small as possible, i.e., to maintain it within 1% of the subcarrier frequency interval. However, this method necessitates precise estimation of frequency offset. In addition, when a multicarrier signal mixed with noise is received, a problem is that the accuracy of the frequency offset estimation is lost when the noise level is high. Furthermore, this method does not operate correctly on a high-speed fading channel, i.e., on a high-speed fading channel on which the Doppler shift is not constant with respect to a transmission symbol and, moreover, varies with time.

Consider a subchannel $ch_0$ of interest and first and second adjacent subchannels $ch_1$, $ch_2$ disposed above the subchannel of interest. FIGS. 1 and 2 illustrate the frequency responses of three subchannels in a case where the frequency offset is zero (FIG. 1) and in a case where the frequency offset is non-zero (FIG. 2). Signals of center frequencies $f_0$, $f_1$, $f_2$ that correspond to first, second and third subchannels are indicated by vertical arrows in FIGS. 1 and 2. In FIGS. 1 and 2, subchannel $ch_0$ indicates the channel of interest, and subchannel numbers $ch_1$, $ch_2$ indicate two subchannels placed above the channel of interest in terms of the frequency scale. If we let T represent the period of a DMT symbol, the frequency scale is normalized by a channel interval that is equal to 1/T. That is, one unit of the frequency scale is the channel interval. When the frequency offset (normalized by the channel interval) $\alpha$ is 0, as shown in FIG. 1, the transfer functions of the upper subchannels $ch_1$, $ch_2$ indicated by the dashed lines B, C in FIG. 1 impart infinite attenuation at the center frequency $f_0$ of the subchannel of interest (solid line A). More specifically, if the frequency offset $\alpha$ is zero, the higher-order subchannels do not produce ICI in the subchannel of interest. In other words, if the frequency offset $\alpha$ is zero, the subchannels are orthogonal and absolutely no ICI exists.

If the frequency offset $\alpha$ is not zero, however, subchannel orthogonality is lost and ICI is produced. FIG. 2 illustrates the spectral characteristic of each subchannel when the frequency offset $\alpha$ is non-zero in a DMT system. Crosstalk signals from subchannels $Ch_1$, $Ch_2$ to the subchannel $ch_0$ of interest have non-zero mutual gains indicated at $\alpha_{1,0}$, $\alpha_{2,0}$ in FIG. 2. According to this notation, the first index of $\alpha$ indicates the subchannel that is the source of interference, and the second index indicates the subchannel upon which the interference is inflicted. Thus, if the frequency offset $\alpha$ is non-zero, ICI (crosstalk) is produced in the non-zero mutual gains, i.e., between subchannels.

FIG. 3 is a general model for illustrating the mutual ICI among three subchannels in a DMT system having frequency offset. Here reference characters $1_0$, $1_1$, $1_2$ represent transmitting devices on subchannels $ch_0$, $ch_1$, $ch_2$, respectively; 2 a receiving device on the subchannel $ch_0$ of interest, 3 a transmission path on the channel $ch_0$ of interest; $4_1$, $4_2$ multipliers for multiplying subchannel signals $D_1$, $D_2$ by leakage transfer coefficients (interference coefficients) $\alpha_{i,0}$ of leakage from the subchannels $ch_1$, $ch_2$ to the subchannel $ch_0$ of interest; $5_1$, $5_2$ combiners for combining crosstalk (ICI) from the subchannels $ch_1$, $ch_2$ with the subchannel of interest; 6 a source of noise; and 7 a noise combiner.

As evident from FIG. 3, the signal from the higher-order subchannel $ch_1$ leaks into the subchannel $ch_0$ of interest via the crosstalk coefficient $\alpha_{1,0}$, and the signal from the higher-order subchannel $ch_2$ leaks into the subchannel $ch_0$ of interest via the crosstalk coefficient $\alpha_{2,0}$.

(b) Technical Problems

Thus, it is necessary to so arrange it that the values (codes in case of binary numbers) of the receive signal on the subchannel $ch_0$ of interest and transmit information symbols be decided correctly even if ICI occurs. For this purpose, the inventor of this application has proposed a receiving apparatus (a turbo receiver) that implements a turbo a posteriori algorithm for improving BER utilizing respective ones of ICIs for cases where the subchannels that impose crosstalk upon the subchannel of interest number one, two and n (patent references PCT/JP02/08763, PCT/JP02/08764, PCT/JP03/02537).

The more the number of subchannels to be considered is increased, the more the BER can be improved. A problem, however, is that the algorithm is complicated and so is the structure of the turbo receiver for implementing this algorithm.

SUMMARY OF THE INVENTION

Accordingly, an object of the present invention is to so arrange it that a receiving apparatus (turbo receiver) that implements a turbo a posteriori algorithm can be realized through a simple structure even if the number of subchannels to be considered increases.

Another object of the present invention is to so arrange it that a turbo receiver can be realized in simple fashion, even if the number of subchannels is increased, by an arrangement using a non-linear limiter.

A first aspect of the present invention is a receiving apparatus in a multicarrier communication system for transmitting data independently via a plurality of subchannels. The receiving apparatus comprises soft-decision target value output means for adjusting and outputting a soft-decision target value, which is the difference between the probability that data received from a subchannel of interest is one of two values and the probability that the data is the other of the two values, using soft-decision target values that have entered from receivers on other subchannels; and a decision unit for rendering a decision on receive data based upon the soft-decision target value-that has been adjusted. The soft-decision target value output means has means for calculating the soft-decision target value, which is the difference between the probability that data received from a subchannel of interest is one of the two values and the probability that the data is the other of the two values; and soft-decision target value adjusting means for adjusting the soft-decision target value on the subchannel of interest subchannel by subchannel using degrees of coupling with the other subchannels and the soft-decision target values that have entered from the receivers on the other subchannels.

The soft-decision target value adjusting means has a non-linear calculation unit for calculating correlation between reference signals, which conform to degree of coupling $\alpha_i$ between the other subchannels and the subchannel of interest, and a receive signal y(t) from the subchannel of interest, and adopting as an input variable a value obtained by combining this correlation and soft-decision target values $LnD_i$ that have entered from the receivers on the other subchannels; and an adjusting unit for adjusting the soft-decision target value on the subchannel of interest based upon each of the output signals of the non-linear calculation units on the other subchannels.

A second aspect of the present invention is a receiving method in a multicarrier communication system for transmitting data independently via a plurality of subchannels. The receiving method comprises calculating a soft-decision target value, which is the difference between the probability that data received from a subchannel of interest is one of two values and the probability that the data is the other of the two values; adjusting the soft-decision target value on the subchannel of interest subchannel by subchannel using degrees of coupling with the other subchannels and soft-decision target values that have entered from receivers on the other subchannels; and deciding receive data based upon the soft-decision target value that has been adjusted.

The step of adjusting the soft-decision target value includes calculating correlation between reference signals, which conform to degrees of coupling $\alpha_i$ between other subchannels and the subchannel of interest, and a receive signal y(t) from the subchannel of interest, combining this correlation and soft-decision target values $LnD_i$ that have entered from receivers on the other subchannels, and performing a non-linear calculation with the combined value serving as an input. The step of adjusting the soft-decision target value includes adjusting the soft-decision target value on the subchannel of interest based upon the result of the non-linear calculation on each of the other subchannels.

In accordance with the first and second aspects of the present invention, BER performance can be improved and a receiving apparatus (turbo receiver) that implements a turbo a posteriori algorithm can be constructed in simple fashion even if the number of subchannels is increased.

Figure 7:
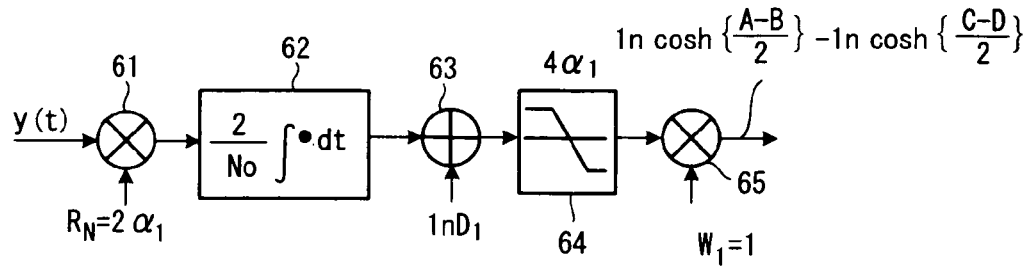
Figure 8:
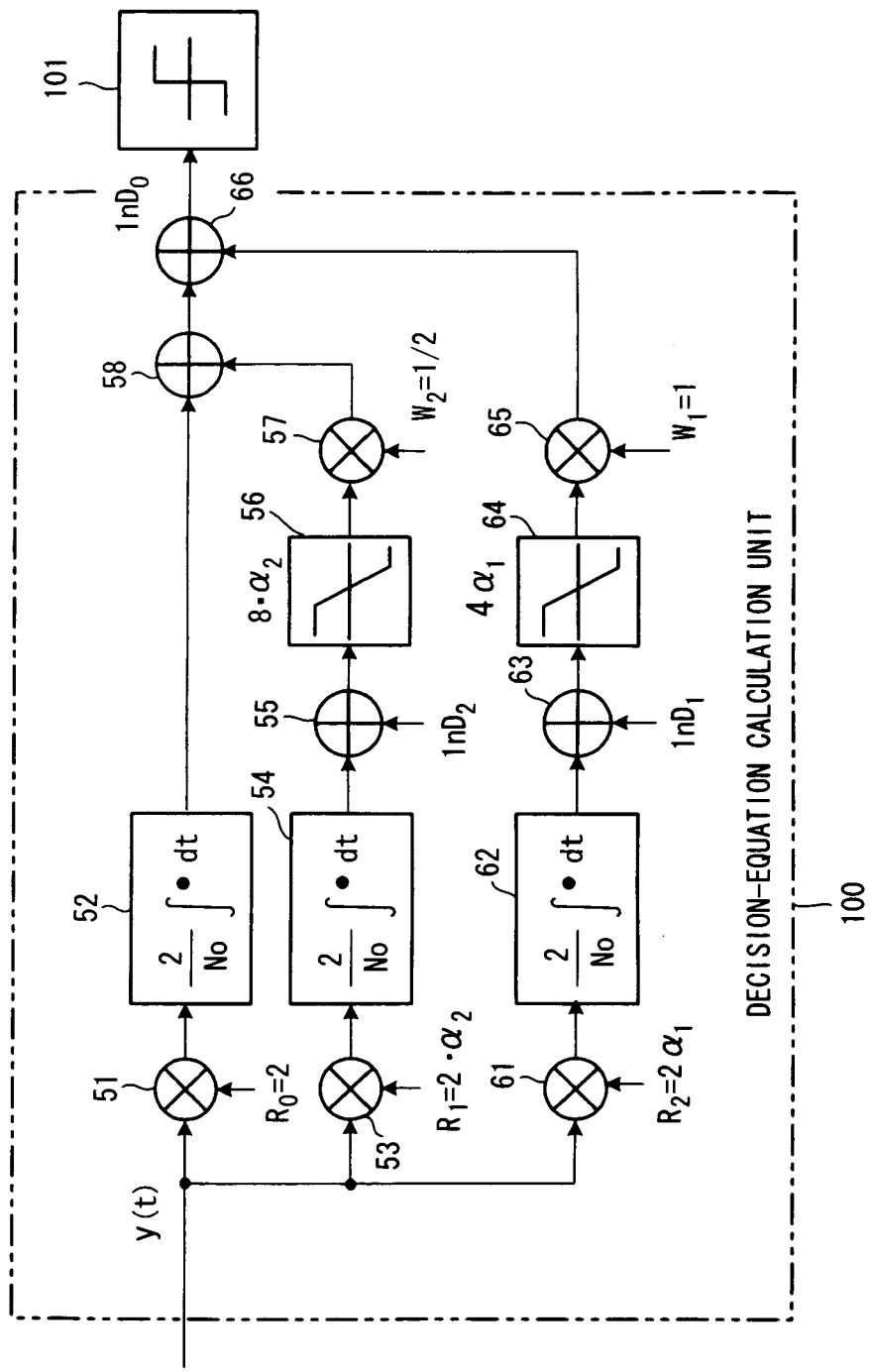
Figure 9:
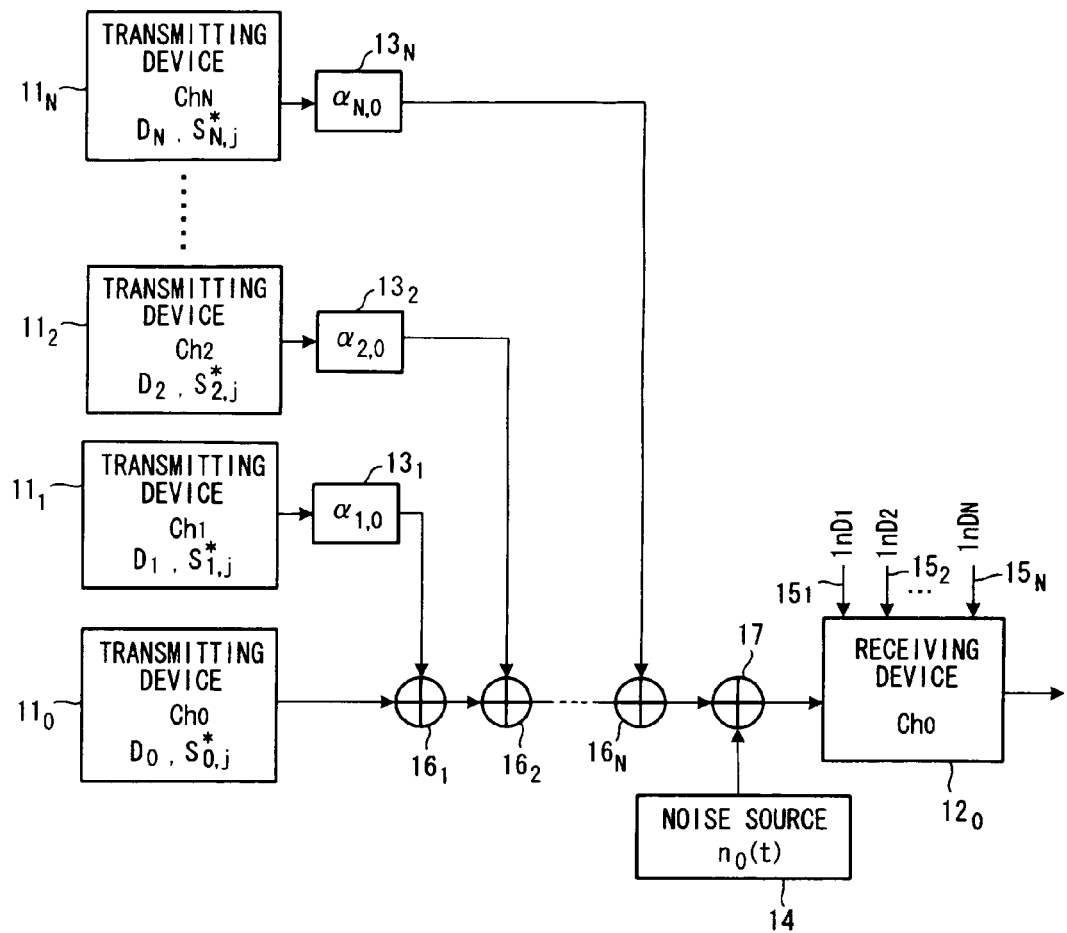
Figure 10:
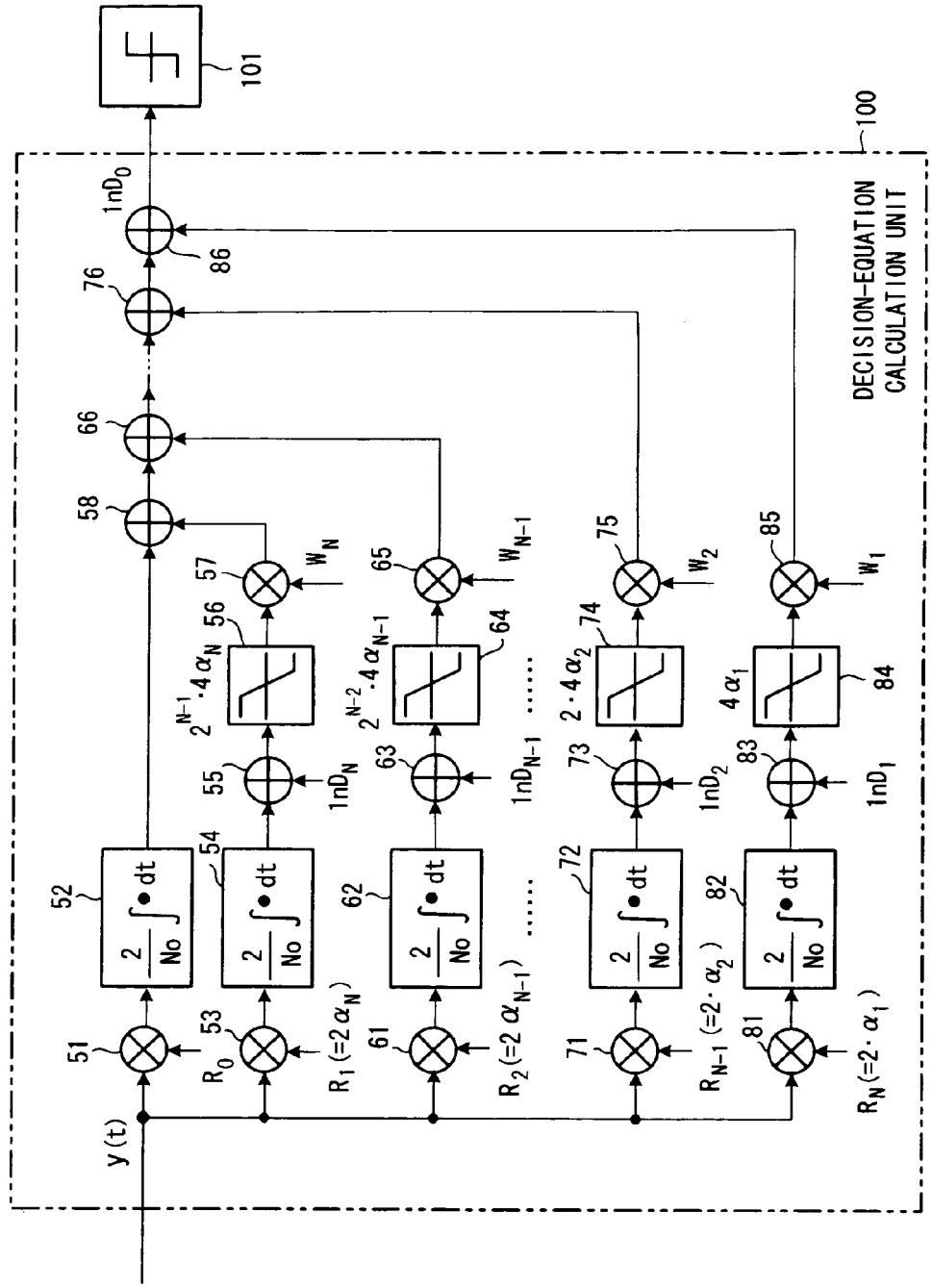
Figure 11:
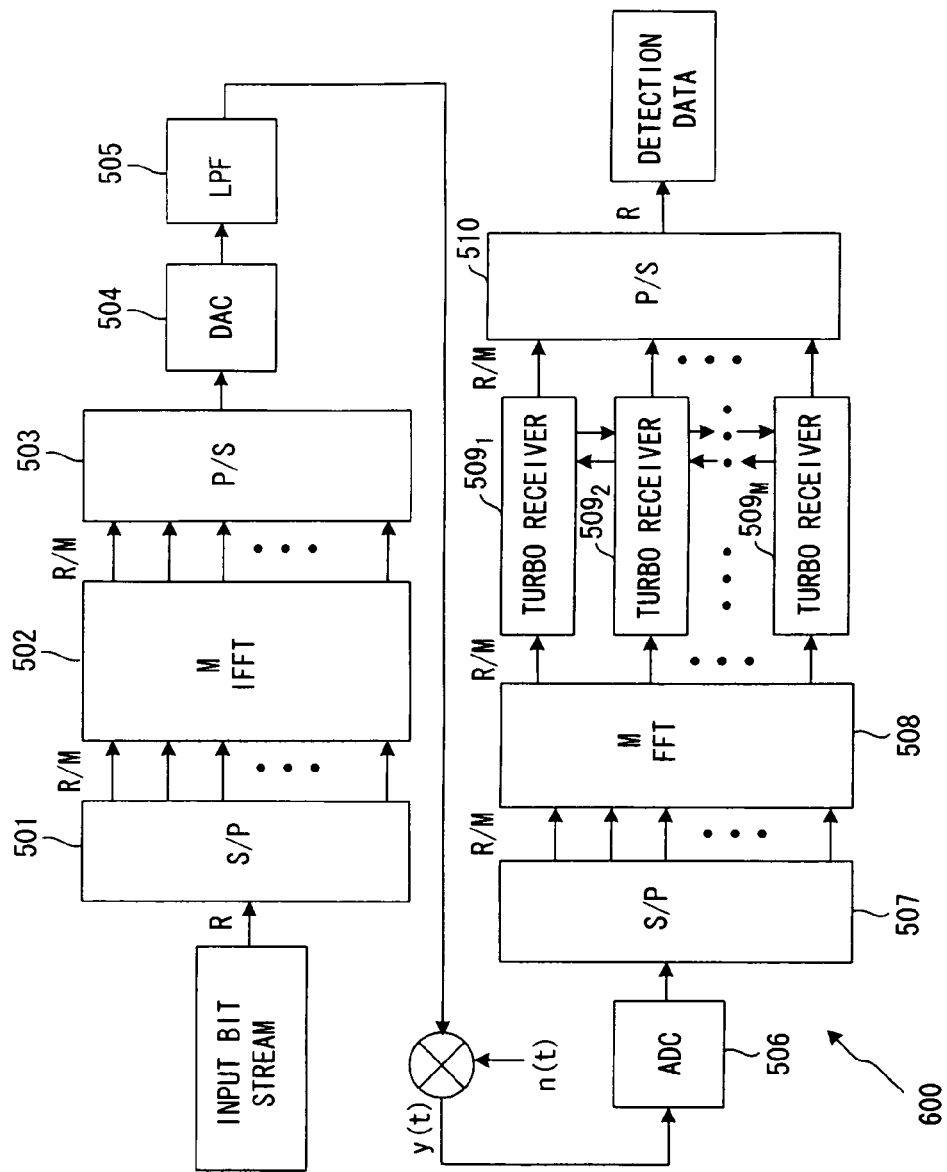
Figure 12:
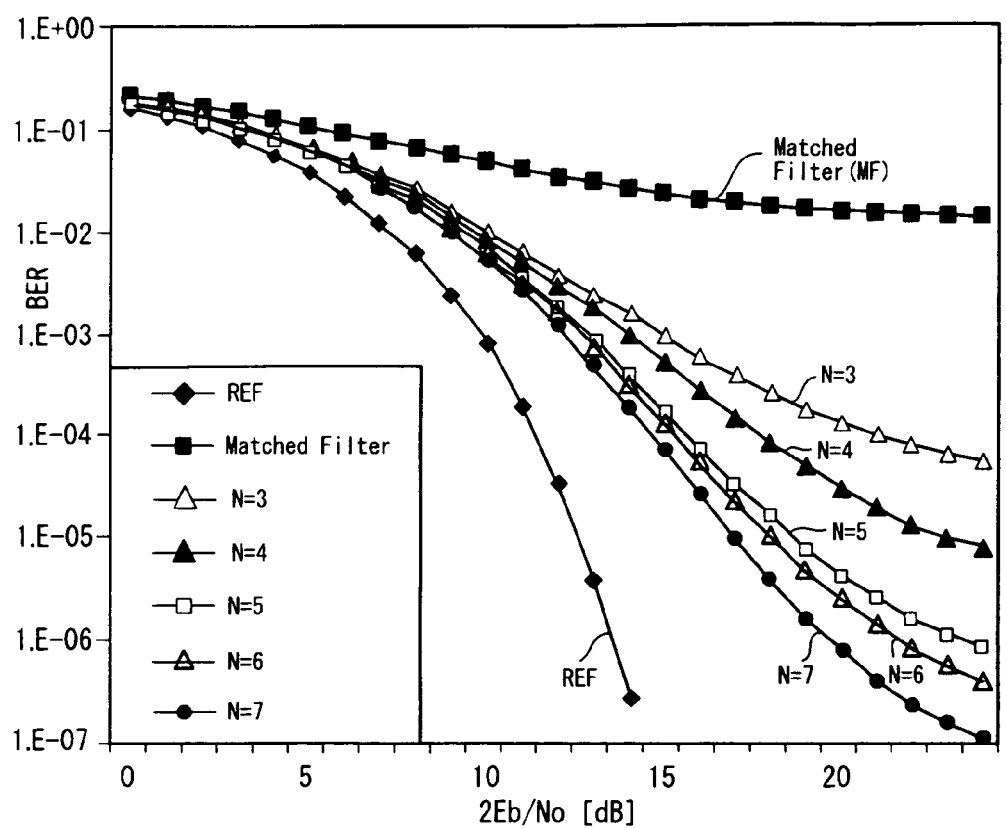

in a decision-equation calculation;

FIG. 7 is a structural view illustrating calculation of $$\ln \cosh\left\{\frac{A-B}{2}\right\} - \ln \cosh\left\{\frac{C-D}{2}\right\}$$

in a decision-equation calculation;

FIG. 8 is a block diagram of a decision-equation calculation unit of the present invention in a case where n=2 holds;

FIG. 9 is a block diagram of the overall configuration of a communication system when n=N is assumed to hold;

FIG. 10 is a block diagram of a decision-equation calculation unit of the present invention in a case where n=N holds;

FIG. 11 is a block diagram of the overall configuration of a DMT-based communication system that employs turbo receivers;

FIG. 12 is a characteristic diagram of BER performance; and

Figure 13:
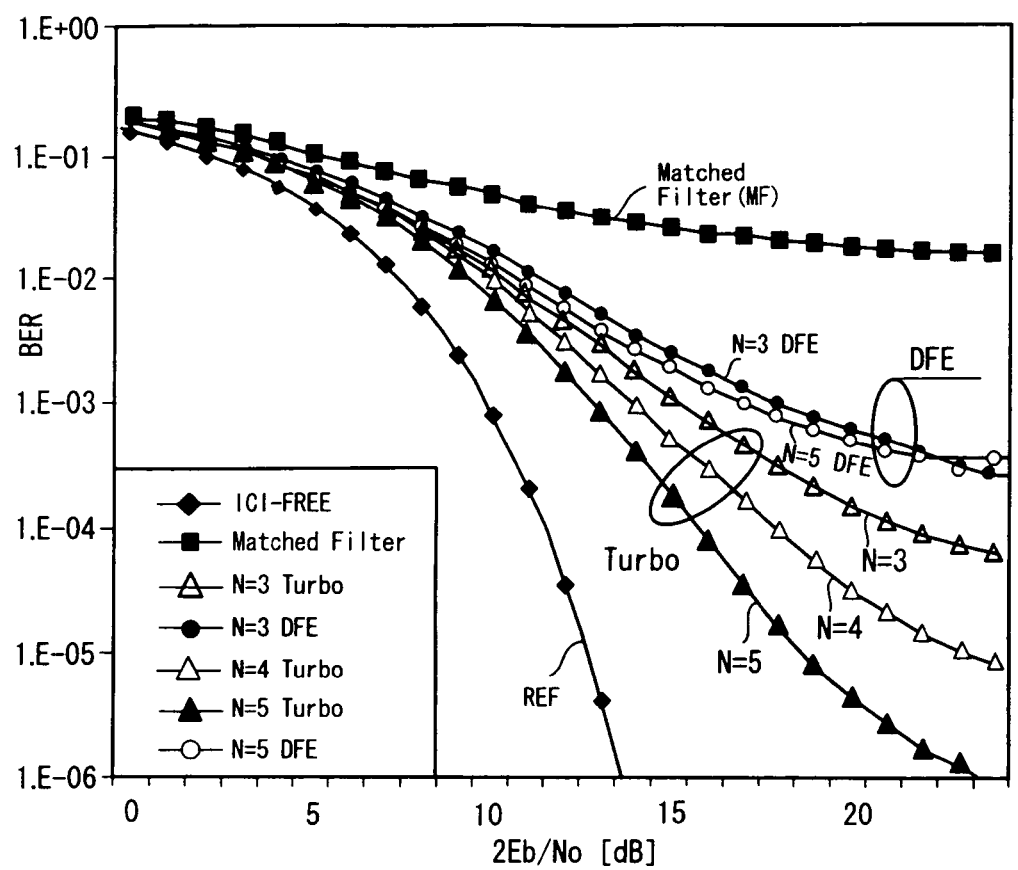

FIG. 13 is another characteristic diagram of BER performance.

Figure 1:
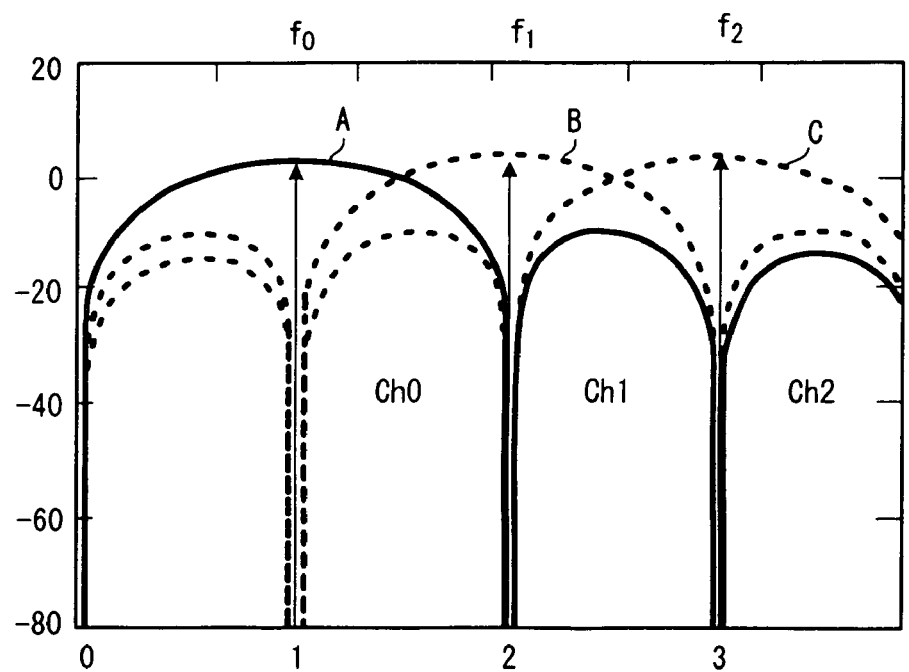
FIG. 1 illustrates frequency response characteristics of a subchannel of interest and higher-order subchannels when frequency offset a is zero.
Figure 2:
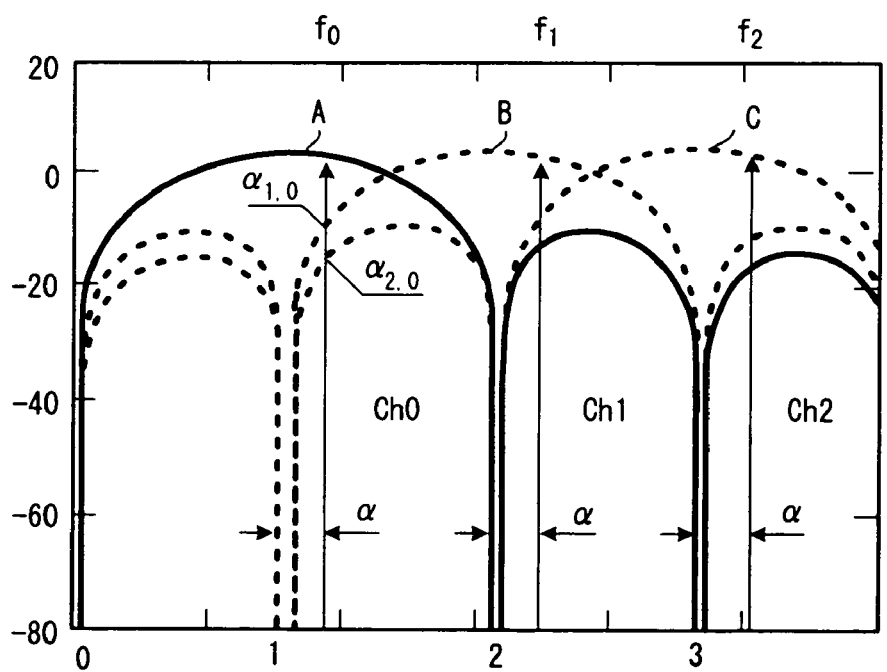
FIG. 2 illustrates frequency response characteristics of a subchannel of interest and higher-order subchannels when frequency offset a is non-zero.
Figure 3:
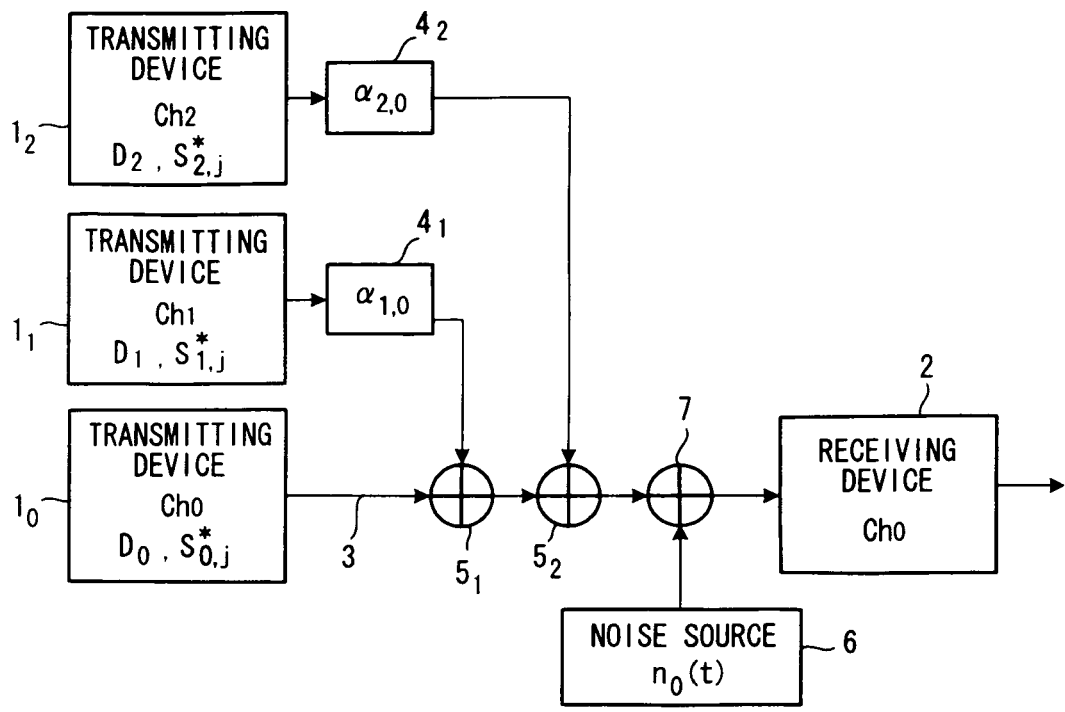
FIG. 3 is a general model of a multicarrier communication system in which ICI exists.
Figure 4:
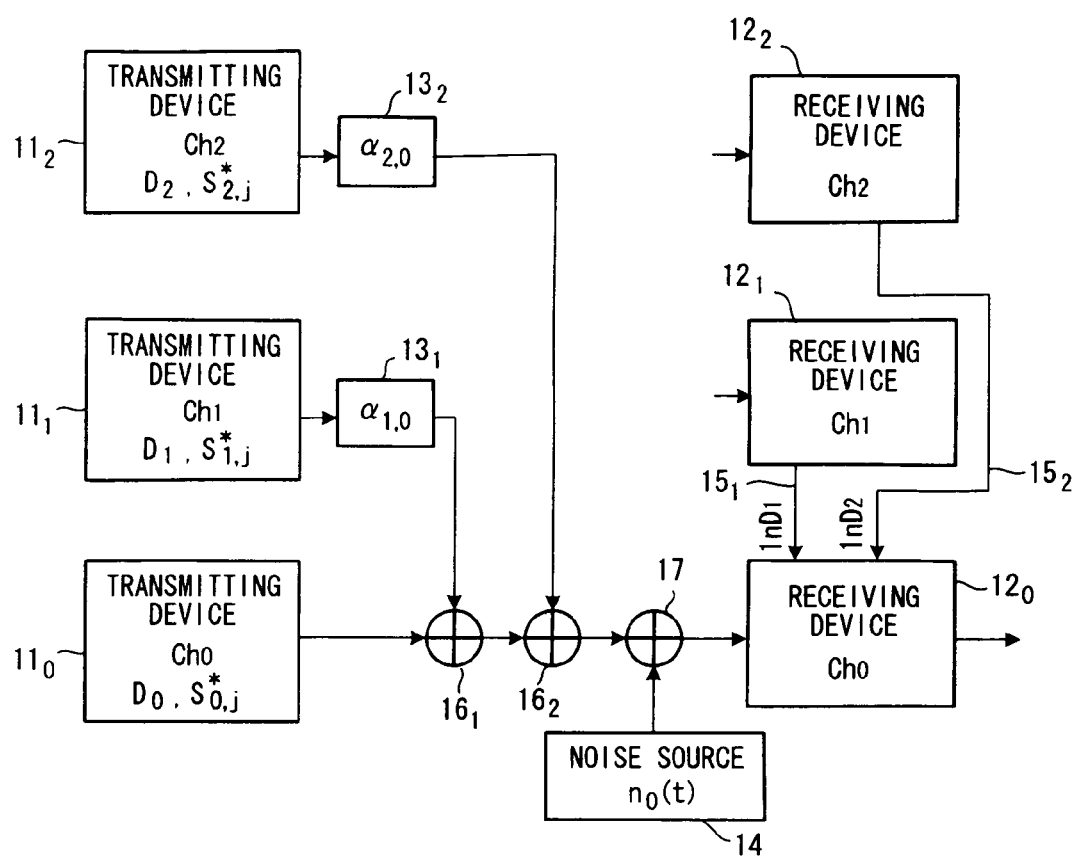
FIG. 4 is a block diagram of the overall configuration of a communication system in which receive data is demodulated utilizing interference from two subchannels.

DESCRIPTION OF THE PREFERRED EMBODIMENTS (A) In Case of Two Subchannels that Inflict Crosstalk (a) Configuration of Overall Communication system FIG. 4 is a block diagram of the overall configuration of a communication system in which receive data is demodulated utilizing interference from two subchannels. The system has three transmitting devices $11_0$, $11_1$, $11_2$ for transmitting data independently over three subchannels $ch_0$, $ch_1$, $ch_2$1 respectively; three receiving devices $12_0$, $12_1$, $12_2$, which are provided on respective ones of the subchannels, for receiving data from the corresponding subchannels and rendering a soft decision regarding the receive data; crosstalk paths $13_1$, $13_2$ having coupling coefficients $\alpha_{1,0}$, $\alpha_{2,0}$ of coupling from the first and second subchannels $ch_1$, $ch_2$ to the subchannel $ch_0$ of interest; a noise source 14; and receive lines $15_1$, $15_2$ for inputting soft-decision target values $1nD_1$, $1nD_2$ on the subchannels $ch_1$, $ch_2$ to the receiving device $12_0$. Furthermore, reference characters $16_1$, $16_2$ and 17 denote combiners for combining ICI signals and noise.

The receiving device $12_0$ on the subchannel $ch_0$ of interest adjusts its own soft-decision target value using the soft-decision target values $1nD_1$, $InD_2$ that have entered from the receiving devices $12_1$, $12_2$ on the subchannels $ch_1$, $ch_2$, and renders a "0", "1" decision the receive data based upon this soft-decision target value. Similarly, each of the other receiving devices also adjusts its own soft-decision target value using the soft-decision target values that have entered from other receiving devices and renders a "0", "1" decision on the receive data based upon this soft-decision target value.

(b) Receive-Symbol Demodulation Algorithm

The algorithm whereby the receiver of the subchannel $ch_0$ of interest demodulates receive symbols in the communication system shown in FIG. 4 will now be described.

The principle of the demodulation algorithm is to derive a value $1nD_0$ that represents the difference between a posteriori probability $P[D_0=+1/y(t)]$ that an information symbol received on the subchannel $ch_0$ of interest is "0" (=+1) and a posteriori probability $P[D_0=31\ 1/y(t)]$ that this information symbol is "1" (=−1). First, the value $1nD_0$ representing the difference between these a posteriori probabilities is derived.

Assume that binary information (2-value information) is transmitted as signals $S^*_{ij}(t)$ via the three subchannels $ch_0$, $ch_1$, $ch_3$. It should be noted that the index i of $S^*_{ij}(t)$ indicates the subchannel (i=0, 1, 2) and the index j is decided by the sign of information signal $D_i$ on subchannel i. That is, the following holds:

if Di=+1, then j=0 if Di=−1, then j=1 \hfill (1)

In order to simplify notation, the time dependence of $S^*_{ij}(t)$ is hereafter omitted in the equations. That is, $S^*_{ij}(t)$ shall be written as $S^*_{ij}$.

It is assumed that the transmit information symbols $D_i$ are statistically independent (have no correlation) and are uniformly distributed probability variables. A signal on the subchannel $ch_0$ of interest that has been influenced by ICI from the subchannels $ch_1$, $ch_2$ is expressed as linear coupling ascribable to the crosstalk coefficients $\alpha_{1,0}$, $\alpha_{2,0}$ between the signals $S^*_{1j}$, $S^*_{1j}$ transmitted on the subchannels and signal $S^*_{0j}$ on the channel of interest. It should be noted that the crosstalk coefficients $\alpha_{1,0}$, $\alpha_{2,0}$ are values that conform to crosstalk leakage. If the information symbol $D_0$ on the subchannel of interest is +1, then the receive signal $S_j$ (j=0 to 3) on the subchannel of interest will be as follows depending upon whether signals $D_1$, $D_2$ on the subchannels $ch_0$, $ch_1$ are +1 or −1:

$$\begin{cases} S_0 = S^*_{00} + \alpha_{10} \cdot S^*_{10} + \alpha_{20} \cdot S^*_{20}, D_0 = +1, D_1 = +1, D_2 = +1 \\ S_1 = S^*_{00} + \alpha_{10} \cdot S^*_{10} - \alpha_{20} \cdot S^*_{20}, D_0 = +1, D_1 = +1, D_2 = -1 \\ S_2 = S^*_{00} - \alpha_{10} \cdot S^*_{10} + \alpha_{20} \cdot S^*_{20}, D_0 = +1, D_1 = -1, D_2 = +1 \\ S_3 = S^*_{00} - \alpha_{10} \cdot S^*_{10} - \alpha_{20} \cdot S^*_{20}, D_0 = +1, D_1 = -1, D_2 = -1 \end{cases} \quad (2)$$

The j of symbol $S_j$ represents the signal number. Similarly, if the information symbol $D_0$ on the subchannel of interest is −1, then the receive signal $S_j$ (j=4 to 7) on the subchannel of interest will be as follows depending upon whether signals $D_1$, $D_2$ on the lower- and higher-order subchannels $ch_0$, $ch_1$ are +1 or −1:

$$\begin{cases} S_4 = -S^*_{00} + \alpha_{10} \cdot S^*_{10} + \alpha_{20} \cdot S^*_{20} = -S_3, D_0 = -1, D_1 = +1, D_2 = +1 \\ S_5 = -S^*_{00} + \alpha_{10} \cdot S^*_{10} - \alpha_{20} \cdot S^*_{20} = -S_2, D_0 = -1, D_1 = +1, D_2 = -1 \\ S_6 = -S^*_{00} - \alpha_{10} \cdot S^*_{10} + \alpha_{20} \cdot S^*_{20} = -S_1, D_0 = -1, D_1 = -1, D_2 = +1 \\ S_7 = -S^*_{00} - \alpha_{10} \cdot S^*_{10} - \alpha_{20} \cdot S^*_{20} = -S_0, D_0 = -1, D_1 = -1, D_2 = -1 \end{cases} \quad (3)$$

After the introduction of ICI, $S_j$ (i=0, 1, 2, ... 7) are used as eight signals input to the receivers on each of the subchannels. The index j of $S_j$ in Equations (2) and (3) indicates the signal number and is decided by pairing the symbols $D_0$, $D_1$, $D_2$ on the subchannel $ch_0$ of interest and subchannels $ch_1$, $ch_2$.

The algorithm for optimum reception can be expanded further by taking ① and ② below into consideration. That is, by taking into account ① that certain information signals are opposite to each other in terms of sign so that $S^*_{10}=-S^*_{11}$, $S^*_{00}=-S^*_{01}$, $S^*_{20}=-S^*_{21}$ holds, and ② that the same signals are used on each of the subchannels in order to transmit the information symbols and $S^*_{10}=S^*_{00}$, $S^*_{20}$ and $S^*_{11}=S^*_{01}$, $S^*_{21}$ hold, the algorithm for optimum reception can be expanded further. The latter item ② indicates the fact that there is no difference among the information signals on all channels with regard to amplitude, waveform and energy, etc. In this case, the signals represented by Equations (2), (3) on each of the subchannels are paired as indicated by the following equations and are opposite in sign.

$$\begin{cases} S_0 = S_{00}^* + \alpha_{10} \cdot S_{10}^* + \alpha_{20} \cdot S_{20}^* = -S_7 \\ S_1 = S_{00}^* + \alpha_{10} \cdot S_{10}^* - \alpha_{20} \cdot S_{20}^* = -S_6 \\ S_2 = S_{00}^* - \alpha_{10} \cdot S_{10}^* + \alpha_{20} \cdot S_{20}^* = -S_5 \\ S_3 = S_{00}^* - \alpha_{10} \cdot S_{10}^* - \alpha_{20} \cdot S_{20}^* = -S_4 \end{cases} \quad (4)$$

The a posteriori probability of receiving signal $S_j$, or in other words, the a posteriori probability $P[S_j/y(t)]$ that the receive signal is $S_j$, is given by the following equation in view of Equations (2), (3) and (4):

$$P[S_j/y(t)] = \quad (5)$$
$$k_0 \cdot P_{apr}(S_j) \cdot P(y(t)/S_j) = k_0 \cdot P_{apr}(S_j) \cdot \exp\left\{\frac{-1}{N_0}\int_0^T [y(t)-S_j]^2 dt\right\}$$

where $k_0$ represents a normalization factor; j the signal number (j=0, 1, ..., 7); y(t) a combined signal [y(t)=$S_j$+n(t)] obtained by combining the signal sequence $S_j$ accompanied by ICI and white Gaussian noise n(t) having a spectral power intensity $N_0$; $P_{apr}(S_j)$ the a priori probability of the receive signal $S_j$; and $P[y(t)/S_j]$ a conditional probability, which is the probability that a sent code word will be $S_j$ when the receive word is y(t).

In view of Equations (2) to (4), the a priori probabilities $P_{apr}(S_j)$ (j=0, 1, ..., 7) on the subchannel of interest are expressed as the cross product of the a priori probability that the signal on the subchannel of interest is $S^*_{00}$ or $S^*_{01}$ and the a posteriori probabilities of the information signal $S^*_{ij}$ on two adjacent subchannels. That is, in case of $D_0$=+1, we have the following:

$$\begin{cases} P_{apr}(S_0) = P(S_{10}^*) \cdot P_{apr}(S_{00}^*) \cdot P(S_{20}^*) \\ P_{apr}(S_1) = P(S_{10}^*) \cdot P_{apr}(S_{00}^*) \cdot P(S_{21}^*) \\ P_{apr}(S_2) = P(S_{11}^*) \cdot P_{apr}(S_{00}^*) \cdot P(S_{20}^*) \\ P_{apr}(S_3) = P(S_{11}^*) \cdot P_{apr}(S_{00}^*) \cdot P(S_{21}^*) \end{cases} \quad (6)$$

and in case of $D_0$=-1, we have the following:

$$\begin{cases} P_{apr}(S_4) = P(S_{10}^*) \cdot P_{apr}(S_{01}^*) \cdot P(S_{20}^*) \\ P_{apr}(S_5) = P(S_{10}^*) \cdot P_{apr}(S_{01}^*) \cdot P(S_{21}^*) \\ P_{apr}(S_6) = P(S_{11}^*) \cdot P_{apr}(S_{01}^*) \cdot P(S_{20}^*) \\ P_{apr}(S_7) = P(S_{11}^*) \cdot P_{apr}(S_{01}^*) \cdot P(S_{21}^*) \end{cases} \quad (7)$$

In Equations (6) and (7), $P_{apr}(S_j)$ is the a priori probability (transmit probability) that the information signal $S_j$ of number j will be transmitted on the subchannel of interest. Further, the a priori probability $P_{apr}(S^*_{ij})$ depends upon the statistics of the data generating source and most realistically is assumed to be equal to ½. The probability $P(S^*_{ij})$ is the a posteriori probability of the receive signal $S^*_{ij}$ and differs from the a priori probability $P_{apr}(S^*_{ij})$; it can be estimated with a high degree of reliability on the receiving side and is expressed by $P(S^*_{ij}) \approx P[S^*_{ij}/y(t)]$. This is the best estimate of $P(S^*_{ij})$ on the white Gaussian noise channel. In view of this assumption, Equations (6) and (7) can be rewritten as indicated below.

$$\begin{cases} P_{apr}(S_0) = P(S_{10}^*/y(t)) \cdot P_{apr}(S_{00}^*) \cdot P(S_{20}^*/y(t)) \\ P_{apr}(S_1) = P(S_{10}^*/y(t)) \cdot P_{apr}(S_{00}^*) \cdot P(S_{21}^*/y(t)) \\ P_{apr}(S_2) = P(S_{11}^*/y(t)) \cdot P_{apr}(S_{00}^*) \cdot P(S_{20}^*/y(t)) \\ P_{apr}(S_3) = P(S_{11}^*/y(t)) \cdot P_{apr}(S_{00}^*) \cdot P(S_{21}^*/y(t)) \end{cases} \quad (8)$$

$$\begin{cases} P_{apr}(S_4) = P(S_{10}^*/y(t)) \cdot P_{apr}(S_{01}^*) \cdot P(S_{20}^*/y(t)) \\ P_{apr}(S_5) = P(S_{10}^*/y(t)) \cdot P_{apr}(S_{01}^*) \cdot P(S_{21}^*/y(t)) \\ P_{apr}(S_6) = P(S_{11}^*/y(t)) \cdot P_{apr}(S_{01}^*) \cdot P(S_{20}^*/y(t)) \\ P_{apr}(S_7) = P(S_{11}^*/y(t)) \cdot P_{apr}(S_{01}^*) \cdot P(S_{21}^*/y(t)) \end{cases} \quad (9)$$

Alternatively, when there is a direct relationship between the information signal $S^*_{ij}$ and transmit information signal $D_i$ [see Equation (1)], $P(S^*_{ij})$=$P[D_i=j/y(t)]$ can be substituted in Equations (6) and (7) and these equations can then be expressed by the following equations, where $P(S^*_{ij})$ is the probability that the ith subchannel signal $D_i$ is j:

$$\begin{cases} P_{apr}(S_0) = P(D_1=+1/y(t)) \cdot P_{apr}(S_{00}^*) \cdot P(D_2=+1/y(t)) \\ P_{apr}(S_1) = P(D_1=+1/y(t)) \cdot P_{apr}(S_{00}^*) \cdot P(D_2=-1/y(t)) \\ P_{apr}(S_2) = P(D_1=-1/y(t)) \cdot P_{apr}(S_{00}^*) \cdot P(D_2=+1/y(t)) \\ P_{apr}(S_3) = P(D_1=-1/y(t)) \cdot P_{apr}(S_{00}^*) \cdot P(D_2=-1/y(t)) \end{cases} \quad (10)$$

$$\begin{cases} P_{apr}(S_4) = P(D_1=+1/y(t)) \cdot P_{apr}(S_{01}^*) \cdot P(D_2=+1/y(t)) \\ P_{apr}(S_5) = P(D_1=+1/y(t)) \cdot P_{apr}(S_{01}^*) \cdot P(D_2=-1/y(t)) \\ P_{apr}(S_6) = P(D_1=-1/y(t)) \cdot P_{apr}(S_{01}^*) \cdot P(D_2=+1/y(t)) \\ P_{apr}(S_7) = P(D_1=-1/y(t)) \cdot P_{apr}(S_{01}^*) \cdot P(D_2=-1/y(t)) \end{cases} \quad (11)$$

In Equations (10) and (11), the a priori probabilities $P_{apr}(S_j)$ (j=0, 1, ..., 7) of the receive signal $S_j$ on the subchannel $ch_0$ of interest are expressed as the channel cross-products of the transmit a priori probabilities $P_{apr}(S^*_{ij})$ of the information signal $S^*_{ij}$ and the a posteriori probabilities that the information symbols $D_i$ received on the two adjacent channels $ch_1$, $ch_2$ are +1 or -1.

In a turbo receiver, the sign of the receive information symbol $D_0$ on the subchannel of interest is decided as follows: The probability $P[D_0=+1/y(t)]$ that the receive information symbol Do on the subchannel of interest (number 0) is +1 and the probability $P[D_0=-1/y(t)]$ that $D_0$ is -1 are obtained and the sign of the receive information symbol $D_0$ is decided by comparing the magnitudes of these probabilities or by comparing the difference between the logarithms of these probabilities with a threshold value.

The a posteriori probability $P[D_0=j/y(t)]$ that the receive information symbol $D_0$ on the subchannel of interest is j can be obtained as the a posteriori probability of receiving a signal for which $D_0$ is j. Accordingly, the a posteriori probability $P[D_0=+1/y(t)]$ is the probability that the receive information symbol $D_0$ on the subchannel of interest will "0" (=+1) and can be obtained as follows: In view of Equations (1) and (2), the signals that transmit the information symbol of "0" (=+1) on the subchannel of interest are $S_0$ to $S_3$, and therefore the posteriori probability $P[D_0=+1/y(t)]$ that the receive information symbol $D_0$ on the subchannel of interest will be "0" (=+1) is the sum of the a posteriori probabilities of receiving the signals $S_0$ to $S_3$. This can be found by Equation (12a). Similarly, the posteriori probability $P[D_0=-1/y(t)]$ that the receive information symbol $D_0$ on the subchannel of interest will be "1" (=-1) can be found by Equation (12b).

$$\begin{cases} P(D_0 = +1/y(t)) = k \cdot [P(S_0/y(t)) + \cdot P(S_1/y(t)) + P(S_2/y(t)) + P(S_3/y(t))] & (12a) \\ P(D_0 = -1/y(t)) = k \cdot [P(S_4/y(t)) + P(S_5/y(t)) + P(S_6/y(t)) + P(S_7/y(t))] & (12b) \end{cases}$$

If Equation (5) is applied to Equation (12a) (where we assume that $k_0=1$ holds), we have the following:

$$P(D_0 = +1/y(t)) = k \cdot [P_{apr}(S_0) \cdot P(y(t)/S_0) + P_{apr}(S_1) \cdot P(y(t)/S_1) + \qquad (13)$$
$$k \cdot [P_{apr}(S_2) \cdot P(y(t)/S_2) + P_{apr}(S_3) \cdot P(y(t)/S_3)]$$

If Equation (10) is substituted into Equation (13) and y(t) is omitted in $P[D_i=\pm 1/y(t)]$ for the purpose of simplification {i.e., if we assume that $P[D_i=\pm 1/y(t)]=P(D_1=\pm 1)$ holds}, then Equation (14) is obtained.

$$P(D_0 = +1/y(t)) = \qquad (14)$$
$$k \cdot \begin{bmatrix} P(D_1 = +1) \cdot P_{apr}(S_{00}^*) \cdot P(D_2 = +1) \cdot P(y(t)/S_0) + \\ P(D_1 = +1) \cdot P_{apr}(S_{00}^*) \cdot P(D_2 = -1) \cdot P(y(t)/S_1) + \\ P(D_1 = -1) \cdot P_{apr}(S_{00}^*) \cdot P(D_2 = +1) \cdot P(y(t)/S_2) + \\ P(D_1 = -1) \cdot P_{apr}(S_{00}^*) \cdot P(D_2 = -1) \cdot P(y(t)/S_3) \end{bmatrix}$$

Equation (15) is obtained in similar fashion.

$$P(D_0 = -1/y(t)) = \qquad (15)$$
$$k \cdot \begin{bmatrix} P(D_1 = +1) \cdot P_{apr}(S_{01}^*) \cdot P(D_2 = +1) \cdot P(y(t)/S_4) + \\ P(D_1 = +1) \cdot P_{apr}(S_{01}^*) \cdot P(D_2 = -1) \cdot P(y(t)/S_5) + \\ P(D_1 = -1) \cdot P_{apr}(S_{01}^*) \cdot P(D_2 = +1) \cdot P(y(t)/S_6) + \\ P(D_1 = -1) \cdot P_{apr}(S_{01}^*) \cdot P(D_2 = -1) \cdot P(y(t)/S_7) \end{bmatrix}$$

If Equation (14) is transformed, we obtain Equations (16a) and (16b).

$$P(D_0 = +1/y(t)) = \qquad (16a)$$
$$k \cdot P_{apr}(S_{00}^*) \cdot [P(D_1 = +1) \cdot P(D_2 = +1) \cdot P(y(t)/S_0) +$$
$$P(D_1 = +1) \cdot P(D_2 = -1) \cdot P(y(t)/S_1)] +$$
$$k \cdot P_{apr}(S_{00}^*) \cdot [P(D_1 = -1) \cdot P(D_2 = +1) \cdot P(y(t)/S_2) +$$
$$P(D_1 = -1) \cdot P(D_2 = -1) \cdot P(y(t)/S_3)]$$

$$P(D_0 = +1/y(t)) = k \cdot P_{apr}(S_{00}^*) \cdot [P(D_1 = +1) \cdot \qquad (16b)$$
$$\{P(D_2 = +1) \cdot P(y(t)/S_0) + P(D_2 = -1) \cdot P(y(t)/S_1)\}] +$$
$$k \cdot P_{apr}(S_{00}^*) \cdot [P(D_1 = -1) \cdot$$
$$\{P(D_2 = +1) \cdot P(y(t)/S_2) + P(D_2 = -1) \cdot P(y(t)/S_3)\}]$$

Similarly, if Equation (15) is transformed, Equation (17) is obtained:

$$P(D_0 = -1/y(t)) = k \cdot P_{apr}(S_{01}^*) \cdot [P(D_1 = +1) \cdot \qquad (17)$$
$$\{P(D_2 = +1) \cdot P(y(t)/S_4) + P(D_2 = -1) \cdot P(y(t)/S_5)\}] +$$
$$k \cdot P_{apr}(S_{00}^*) \cdot [P(D_1 = -1) \cdot$$
$$\{P(D_2 = +1) \cdot P(y(t)/S_6) + P(D_2 = -1) \cdot P(y(t)/S_7)\}]$$

In view of the foregoing, if a posteriori probabilities $P[D_0=+1/y(t)]$, $P[D_0=-1/y(t)]$ that the receive information symbol $D_0$ on the subchannel of interest will be "0" (=+1), "1" (=−1) are found, then the sign (+1 or −1) of the receive information symbol can be decided by comparing the magnitudes of the probabilities or by comparing the difference between the logarithms of these probabilities with a threshold value.

Decision Based Upon Difference Between Logarithms

Whether the information symbol $D_0$ on the subchannel of interest is +1 or −1 is determined by calculating in $P[D_0=+1/y(t)]-\ln P[D_0=1/y(t)]$ (where ln is a base-e logarithm) and then rendering the decision based upon the sign of this difference.

If the following holds:

$$\ln P(D_0=+1/y(t))-\ln P(D_0=-1/y(t))>0 \qquad (18a)$$

then it is judged that $D_0=+1$ holds, and if the following holds:

$$\ln P(D_0=+1/y(t))-\ln P(D_0=-1/y(t))<0 \qquad (18b)$$

then it is judged that $D_0=-1$ holds.

Since the transmit symbols $D_0$ are statistically independent (uncorrelated) and are uniformly distributed probability variables, the following equation is obtained:

$$\begin{cases} P_{apr}(S_{-10}^*) = P_{apr}(S_{00}^*) = P_{apr}(S_{+10}^*) = 1/2 \\ P_{apr}(S_{-11}^*) = P_{apr}(S_{01}^*) = P_{apr}(S_{+11}^*) = 1/2 \end{cases} \qquad (19)$$

In view of Equation (19), the common magnifier in Equations (16b) and (17) has no influence upon the decision rule and therefore Equations (16b) and (17) are written as Equations (20) and (21) below.

$$P(D_0 = +1/y(t)) = P(D_{-1} = +1) \cdot \qquad (20)$$
$$\{P(D_{-1} = +1) \cdot P(y(t)/S_0) + P(D_1 = -1) \cdot P(y(t)/S_1)\} +$$
$$P(D_{-1} = -1) \cdot \{P(D_1 = +1) \cdot P(y(t)/S_2) + P(D_1 = -1) \cdot P(y(t)/S_3)\}$$

$$P(D_0 = -1/y(t)) = \qquad (21)$$
$$P(D_1 = +1) \cdot \{P(D_2 = +1) \cdot P(y(t)/S_4) + P(D_2 = -1) \cdot P(y(t)/S_5)\} +$$
$$P(D_1 = -1) \cdot \{P(D_2 = +1) \cdot P(y(t)/S_6) + P(D_2 = -1) \cdot P(y(t)/S_7)\}$$

By taking into account the algebraic identity of the following equation:

$$\ln(e^X + e^Y) = \frac{X+Y}{2} + \ln 2 + \ln \cosh\left(\frac{X-Y}{2}\right) \qquad (a)$$

and transforming Equation (20), Equation (22) below is obtained. Specifically, if we assume the following:

$$e^X = P(D_1=+1) \cdot \{P(D_2=+1) \cdot P(y(t)/S_0) + P(D_2=-1) \cdot P(y(t)/S_1)\}$$

$$e^Y = P(D_1=-1) \cdot \{P(D_2=+1) \cdot P(y(t)/S_2) + P(D_2=-1) \cdot P(y(t)/S_3)\}$$

then we have $$X = \ln P(D_1=+1) + \ln\{P(D_2=+1) \cdot P(y(t)/S_0) + P(D_2=-1) \cdot P(y(t)/S_1)\}$$

$$Y = \ln P(D_1=-1) + \ln\{P(D_2=+1) \cdot P(y(t)/S_2) + P(D_2=-1) \cdot P(y(t)/S_3)\}$$

If X, Y are substituted into Equation (a), then Equation (22) is obtained.

$$\ln P(D_0 = +1/y(t)) = 1/2 \cdot \ln P(D_1 = +1) + \tag{22}$$
$$1/2 \cdot \ln \cdot \{P(D_2 = +1) \cdot P(y(t)/S_0) + P(D_2 = -1) \cdot P(y(t)/S_1)\} +$$
$$1/2 \cdot \ln P(D_1 = -1) +$$
$$1/2 \cdot \ln\{P(D_2 = +1) \cdot P(y(t)/S_2) + P(D_2 = -1) \cdot P(y(t)/S_3)\} +$$
$$\ln 2 + \ln \cosh$$
$$\left\{ \begin{array}{l} 1/2 \cdot \ln P(D_1 = +1) + 1/2 \cdot \ln\left\{ \begin{array}{l} P(D_2 = +1) \cdot P(y(t)/S_0) + \\ P(D_2 = -1) \cdot P(y(t)/S_1) \end{array} \right\} - \\ 1/2 \cdot \ln P(D_1 = -1) + 1/2 \cdot \ln\left\{ \begin{array}{l} P(D_2 = +1) \cdot P(y(t)/S_2) + \\ P(D_2 = +1) \cdot P(y(t)/S_3) \end{array} \right\} \end{array} \right\}$$

Similarly, by taking into account the algebraic identity of (a) and transforming Equation (21), Equation (23) below is obtained. Specifically, if we assume the following:

$$e^X = P(D_1=+1) \cdot \{P(D_2=+1) \cdot P(y(t)/S_4) + P(D_2=-1) \cdot P(y(t)/S_5)\}$$

$$e^Y = P(D_1=-1) \cdot \{P(D_2=+1) \cdot P(y(t)/S_6) + P(D_2=-1) \cdot P(y(t)/S_7)\}$$

then we have $$X = \ln P(D_1=+1) + \ln\{P(D_2=+1) \cdot P(y(t)/S_4) + P(D_2=-1) \cdot P(y(t)/S_5)\}$$

$$Y = \ln P(D_1=-1) + \ln\{P(D_2=+1) \cdot P(y(t)/S_6) + P(D_2=-1) \cdot P(y(t)/S_7)\}$$

If X, Y are substituted into Equation (a), then Equation (23) is obtained.

$$\ln P(D_0 = -1/y(t)) = 1/2 \cdot \ln P(D_1 = +1) + \tag{23}$$
$$1/2 \cdot \ln \cdot \{P(D_2 = +1) \cdot P(y(t)/S_4) + P(D_2 = -1) \cdot P(y(t)/S_5)\} +$$
$$1/2 \cdot \ln P(D_1 = -1) +$$
$$1/2 \cdot \ln\{P(D_2 = +1) \cdot P(y(t)/S_6) + P(D_2 = -1) \cdot P(y(t)/S_7)\} +$$
$$\ln 2 + \ln \cosh$$
$$\left\{ \begin{array}{l} 1/2 \cdot \ln P(D_1 = +1) + 1/2 \cdot \ln\left\{ \begin{array}{l} P(D_2 = +1) \cdot P(y(t)/S_4) + \\ P(D_2 = -1) \cdot P(y(t)/S_5) \end{array} \right\} - \\ 1/2 \cdot \ln P(D_1 = -1) + 1/2 \cdot \ln\left\{ \begin{array}{l} P(D_2 = +1) \cdot P(y(t)/S_6) + \\ P(D_2 = +1) \cdot P(y(t)/S_7) \end{array} \right\} \end{array} \right\}$$

Derivation of New Decision Equation

If the following Equations (24), (25):

$$\ln P(D_0 = +1/y(t)) = \frac{A+B}{2} + \ln 2 + \ln \cosh\left\{\frac{A-B}{2}\right\} \tag{24}$$

$$\ln P(D_0 = -1/y(t)) = \frac{C+D}{2} + \ln 2 + \ln \cosh\left\{\frac{C-D}{2}\right\} \tag{25}$$

are employed, then A, B, C and D become as follows:

$$A = \ln P(D_1=+1) + \ln\{P(D_2=+1) \cdot P(y(t)/S_0) + P(D_2=-1) \cdot P(y(t)/s_1)\}$$

$$B = \ln P(D_1=+1) + \ln\{P(D_2=+1) \cdot P(y(t)/S_2) + P(D_2=-1) \cdot P(y(t)/s_3)\}$$

$$C = \ln P(D_1=+1) + \ln\{P(D_2=+1) \cdot P(y(t)/S_4) + P(D_2=-1) \cdot P(y(t)/s_5)\}$$

$$D = \ln P(D_1=+1) + \ln\{P(D_2=+1) \cdot P(y(t)/S_6) + P(D_2=-1) \cdot P(y(t)/s_7)\}$$

If Equations (24), (25) are applied to the decision expressions on the left side of Equations (18a), (18b), a new decision equation becomes as follows:

$$\ln D_0 = \frac{A+B}{2} - \frac{C+D}{2} + \ln \cosh\left\{\frac{A-B}{2}\right\} - \ln \cosh\left\{\frac{C-D}{2}\right\} \tag{26}$$

Taking into account the relation $$P(y(t)/S_j) = \exp\left\{-\frac{1}{N_0}\int_0^T [y(t) - S_j]^2 \, dt\right\}$$

obtained from Equation (5) and Equation (4), each of the terms constituting the new decision equation of Equation (26) can be rewritten as set forth below. It should be noted that $\ln D_i = \ln P(D_i=+1) - \ln P(D_i=-1)$ holds.

Method of Calculating $$\frac{A+B}{2} - \frac{C+D}{2}$$

in new decision equation $$A + B - C - D = \tag{27}$$
$$\frac{2}{N_0}\left[\int_0^T y(t) \cdot S_0(t) \, dt + \int_0^T y(t) \cdot S_1(t) \, dt + \int_0^T y(t) \cdot S_2(t) \, dt + \int_0^T y(t) \cdot S_3(t) \, dt\right] + \ln \cosh$$
$$\left\{1/2 \cdot \left\{\ln D_2 + \frac{2}{N_0}\left[\int_0^T y(t) \cdot S_0(t) \, dt - \int_0^T y(t) \cdot S_1(t) \, dt\right] - \frac{E_0 - E_1}{N_0}\right\}\right\} - \ln \cosh\left\{1/2 \cdot \left\{\ln D_2 + \frac{2}{N_0}\left[\int_0^T y(t) \cdot S_0(t) \, dt - \int_0^T y(t) \cdot S_1(t) \, dt\right] + \frac{E_0 - E_1}{N_0}\right\}\right\} +$$

-continued $$\ln \cosh\left\{1/2 \cdot \left\{\ln D_2 + \frac{2}{N_0}\left[\int_0^T y(t) \cdot S_2(t) dt - \int_0^T y(t) \cdot S_3(t) dt\right] - \frac{E_2 - E_3}{N_0}\right\}\right\} - \quad (27)$$
$$\ln \cosh\left\{1/2 \cdot \left\{\ln D_2 + \frac{2}{N_0}\left[\int_0^T y(t) \cdot S_2(t) dt - \int_0^T y(t) \cdot S_3(t) dt\right] + \frac{E_2 - E_3}{N_0}\right\}\right\}$$

In the equation cited above, $\ln D_i = \ln P(D_i = +1/y(t)) - \ln P(D_i = -1/y(t))$ is the difference between the logarithms of the a posteriori probabilities that the signal $D_i$ that has been transmitted on the ith subchannel is $+1$ or $-1$ (i.e., the soft decision value on the ith channel).

Further, the energy $E_j$ of the signal $S_j(t)$ is $$E_j = \int_0^T S_j^2(t) dt.$$

Figure 5:
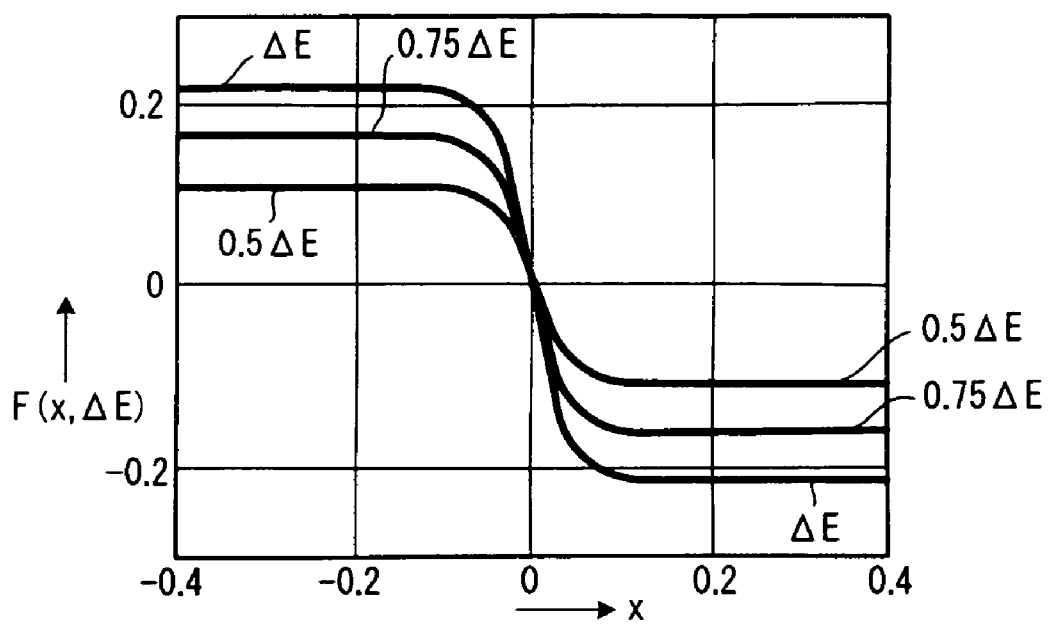
FIG. 5 is a transfer characteristic diagram of an amplification limiter having a transfer function $$F(x, \Delta E) = \ln \cosh\left\{\frac{x - \Delta E}{2}\right\} - \ln \cosh\left\{\frac{x + \Delta E}{2}\right\};$$

Furthermore, we have the following from Equation (2):

$S_0 + S_1 + S_2 + S_3 = 4$ $S_0 - S_1 - S_2 - S_3 = 2 \cdot \alpha_{2,0} = 2 \cdot \alpha_2$ $S_0 + S_1 - S_2 - S_3 = 4 \cdot \alpha_{1,0} = 4 \cdot \alpha_1$ and we have the following:

$\Delta E_1 = E_0 - E_1 = 4(1 + \alpha_1 + \alpha_2)$ $\Delta E_2 = E_2 - E_3 = -4(1 + \alpha_1 - \alpha_2)$ $\Delta E_1 + \Delta E_2 = 8\alpha_2$ Further, the function $$F(x, \Delta E) = \ln \cosh\left\{\frac{x - \Delta E}{2}\right\} - \ln \cosh\left\{\frac{x + \Delta E}{2}\right\}$$

is the transfer function of an amplification limiter and the characteristic thereof should be as shown in FIG. 5. In FIG. 5, the horizontal axis is x and the vertical axis is $F(x, \Delta E)$.

From the foregoing, the second and third terms on the right side of Equation (27) indicate a transfer characteristic of a first limiter that has a limit value $\Delta E_1$ and that adopts $$\ln D_2 + \frac{2}{N_0}\int_0^T y(t) \cdot 2 \cdot \alpha_2 dt \text{ as } x,$$

and the fourth and fifth terms indicate a transfer characteristic of a second limiter that have a limit value $\Delta E_2$ and that adopts $$\ln D_2 + \frac{2}{N_0}\int_0^T y(t) \cdot 2 \cdot \alpha_2 dt \text{ as } x.$$

If the transfer characteristics of these two limiters are combined, then the second to fifth terms on the right side of Equation (27) can be approximated by the transfer characteristic of a single limiter that has a limit value $\Delta E_1 + \Delta E_2$ ($=8 \cdot \alpha_{2,0}$) and that adopts $$\ln D_2 + \frac{2}{N_0}\int_0^T y(t) \cdot 2 \cdot \alpha_2 dt \text{ as } x.$$

That is, the second to fifth terms on the right side of Equation (27) can be expressed approximately by the right side of Equation (28).

$$\ln \cosh\left\{1/2 \cdot \left\{\ln D_2 + \frac{2}{N_0}\left[\int_0^T y(t) \cdot S_0(t) dt - \int_0^T y(t) \cdot S_1(t) dt\right] - \frac{E_0 - E_1}{N_0}\right\}\right\} - \ln \cosh \quad (28)$$
$$\left\{1/2 \cdot \left\{\ln D_2 + \frac{2}{N_0}\left[\int_0^T y(t) \cdot S_0(t) dt - \int_0^T y(t) \cdot S_1(t) dt\right] + \frac{E_0 - E_1}{N_0}\right\}\right\} + \ln \cosh$$
$$\left\{1/2 \cdot \left\{\ln D_2 + \frac{2}{N_0}\left[\int_0^T y(t) \cdot S_2(t) dt - \int_0^T y(t) \cdot S_3(t) dt\right] - \frac{E_2 - E_3}{N_0}\right\}\right\} - \ln \cosh$$
$$\left\{1/2 \cdot \left\{\ln D_2 + \frac{2}{N_0}\left[\int_0^T y(t) \cdot S_2(t) dt - \int_0^T y(t) \cdot S_3(t) dt\right] + \frac{E_2 - E_3}{N_0}\right\}\right\} \approx$$
$$\ln \cosh\left\{1/2 \cdot \left\{\ln D_2 + \frac{2}{N_0}\left[\int_0^T y(t) \cdot 2 \cdot \alpha_2 dt - 8 \cdot \alpha_2/N_0\right]\right\}\right\} -$$
$$\ln \cosh\left\{1/2 \cdot \left\{\ln D_2 + \frac{2}{N_0}\left[\int_0^T y(t) \cdot 2 \cdot \alpha_2 dt + 8 \cdot \alpha_2/N_0\right]\right\}\right\}$$

Figure 6:
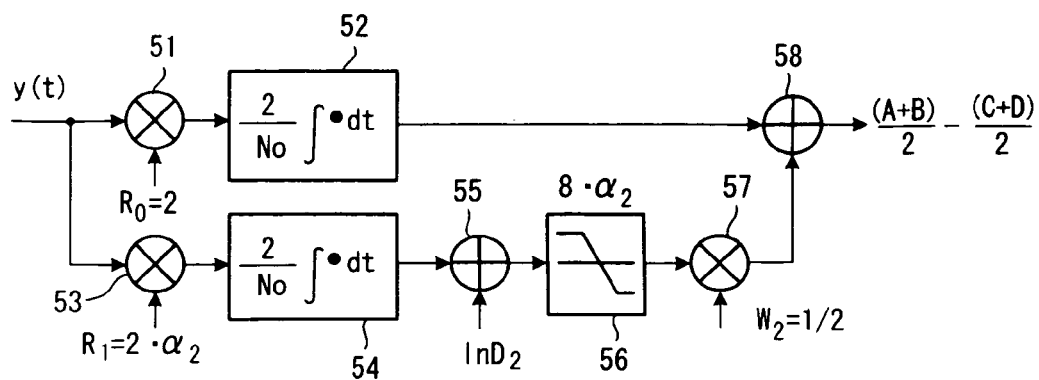
FIG. 6 is a structural view illustrating calculation of $$\frac{A+B}{2} - \frac{C+D}{2}$$

In view of the foregoing, $$\frac{A+B}{2} - \frac{C+D}{2}$$

in the decision equation of Equation (26) can be adapted as shown in FIG. 6 using a limiter. It should be noted that the following holds in FIG. 6:

$R_0 = 4/2 = 2$ $R_1 = 2 \cdot \alpha_{2,0} = 2 \cdot \alpha_2$ $R_2 = 2 \cdot \alpha_{1,0} = 2 \cdot \alpha_1$ $w_2 = \frac{1}{2}$ A multiplier 51 and an integrator (correlator) 52 calculate a value that is one-half of the right side of Equation (27). That is, the multiplier 51 multiplies a signal $R_0$, which is obtained by halving $S_0 + S_1 + S_2 + S_3$ ($=4$) that is the result of eliminating the time dependence of $S_0(t) + S_1(t) + S_2(t) + S_3(t)$ ($=4$), by the receive signal $y(t)$, and the integrator 52 integrates the result of multiplication and outputs the correlation the signal $R_0$ and the receive signal $y(t)$. This correlation is the soft-decision target value $LnD_0$ on the subchannel $ch_0$ of interest prior to correction.

A multiplier 53, integrator 54 and adder 55 calculate a variable $$x = \Delta \ln D_2 + \frac{2}{N_0} \int_0^T y(t) \cdot 2 \cdot \alpha_{2,0} \, dt$$

in a limiter transfer function F(x, ΔE), and a limiter 56 calculates the transfer function F(x, ΔE) prevailing when the variable x is input, i.e., calculates the second to fifth terms on the right side of Equation (27). A multiplier 57 multiplies the limiter output by $w_2$ (=½), and an adder 58 combines the output of the integrator 52 and the output of the multiplier 57 and outputs $$\frac{A+B}{2} - \frac{C+D}{2}.$$

It should be noted that the multiplier 53 multiplies a signal, in which $S_0-S_1$ (=$2 \cdot \alpha_2$) that is the result of eliminating the time dependence of $S_0(t)-S_1(t)$ is adopted as $R_1$, by the receive signal y(t). That is, the multiplier 53 multiplies a signal, in which the coupling $\alpha_2$ between the subchannel $ch_2$ and the subchannel of interest is adopted as $R_1$, by the receive signal y(t), and the integrator 54 integrates the result of multiplication and outputs the correlation between the signal $R_1$ and the receive signal y(t). A value obtained by combining this correlation and the soft-decision target value $LnD_2$ that has entered from the receiver on subchannel $ch_2$ is input to the limiter 56 as x, and the limiter 56 outputs f(x, ΔE). Based upon f(x, ΔE), the adder 58 corrects the soft-decision target value $lnD_0$ on subchannel $ch_0$ of interest that is output from the integrator 52.

Method of Calculating $$\ln \cosh\left\{\frac{A-B}{2}\right\} - \ln \cosh\left\{\frac{C-D}{2}\right\}$$

in New Decision Equation (A-B) and (C-D) are expressed by Equations (29) and (30), respectively.

(A-B)=

$$\ln D_1 + 1/2 \cdot \qquad (29)$$

$$\left\{\frac{2}{N_0}\left[\int_0^T y(t) \cdot S_0(t) dt + \int_0^T y(t) \cdot S_1(t) dt - \int_0^T y(t) \cdot S_2(t) dt - \int_0^T y(t) \cdot S_3(t) dt\right] - \frac{\Delta E_\Sigma}{N_0}\right\} + \ln \cosh\left\{1/2 \cdot \left\{\ln D_2 + \frac{2}{N_0}\left[\int_0^T y(t) \cdot S_0(t) dt - \int_0^T y(t) \cdot S_1(t) dt\right] - \frac{E_0 - E_1}{N_0}\right\}\right\} - \ln \cosh\left\{1/2 \cdot \left\{\ln D_2 + \frac{2}{N_0}\left[\int_0^T y(t) \cdot S_2(t) dt - \int_0^T y(t) \cdot S_3(t) dt\right] + \frac{E_2 - E_3}{N_0}\right\}\right\}$$

-continued $$(C-D) = \ln D_1 + 1/2 \cdot \qquad (30)$$

$$\left\{\frac{2}{N_0}\left[\int_0^T y(t) \cdot S_0(t) dt + \int_0^T y(t) \cdot S_1(t) dt - \int_0^T y(t) \cdot S_2(t) dt - \int_0^T y(t) \cdot S_3(t) dt\right] + \frac{\Delta E_\Sigma}{N_0}\right\} + \ln \cosh\left\{1/2 \cdot \left\{\ln D_2 + \frac{2}{N_0}\left[\int_0^T y(t) \cdot S_2(t) dt - \int_0^T y(t) \cdot S_3(t) dt\right] + \frac{E_2 - E_3}{N_0}\right\}\right\} - \ln \cosh\left\{1/2 \cdot \left\{\ln D_2 + \frac{2}{N_0}\left[\int_0^T y(t) \cdot S_0(t) dt - \int_0^T y(t) \cdot S_1(t) dt\right] + \frac{E_0 - E_1}{N_0}\right\}\right\}$$

In order to simplify calculation, the non-linear element ln cosh(·) in Equations (29) and (3) is omitted. If calculation is thus simplified, $$\ln \cosh\left\{\frac{A-B}{2}\right\} - \ln \cosh\left\{\frac{C-D}{2}\right\} \ln \cosh\frac{A-B}{2} - \ln \cosh\frac{C-D}{2} =$$

can be expressed by Equation (31).

$$\ln \cosh\left\{1/2 \cdot \left\{\ln D_1 + \frac{2}{2N_0}\left[\int_0^T y(t) \cdot 4\alpha_1 \, dt - \frac{\Delta E_\Sigma}{2N_0}\right]\right\}\right\} - \qquad (31)$$

$$\ln \cosh\left\{1/2 \cdot \left\{\ln D_1 + \frac{2}{2N_0}\left[\int_0^T y(t) \cdot 4\alpha_1 \, dt + \frac{\Delta E_\Sigma}{2N_0}\right]\right\}\right\}$$

If we assume that the following holds: $\Delta E_{93} = \Delta E_1 + \Delta E_2 = 8 \cdot \alpha_{1,0} = 8 \cdot \alpha_1$, then Equation (31) can be written as follows:

$$\ln \cosh\frac{A-B}{2} - \ln \cosh\frac{C-D}{2} = \qquad (32)$$

$$\ln \cosh\left\{1/2 \cdot \left\{\ln D_1 + \frac{2}{2N_0}\int_0^T y(t) \cdot 4\alpha_1 \, dt - \frac{4\alpha_1}{N_0}\right\}\right\} -$$

$$\ln \cosh\left\{1/2 \cdot \left\{\ln D_1 + \frac{2}{2N_0}\int_0^T y(t) \cdot 4\alpha_1 \, dt + \frac{4\alpha_1}{N_0}\right\}\right\}$$

Equation (32) represents a transfer characteristic of one limiter that has a limit value $4 \cdot \alpha_1$ and that adopts $$\ln D_1 + \frac{2}{2N_0}\int_0^T y(t) \cdot 4 \cdot \alpha_1 \, dt \text{ as } x.$$

In view of the foregoing, $$\ln \cosh\left\{\frac{A-B}{2}\right\} - \ln \cosh\left\{\frac{C-D}{2}\right\}$$

in the decision equation of Equation (26) can be adapted as shown in FIG. 7 using a limiter. That is, in FIG. 7, a multiplier 61, an integrator 62 and an adder 63 calculate a variable $$x = \ln D_1 + \frac{2}{2N_0} \int_0^T y(t) \cdot 4 \cdot \alpha_1 \, dt$$

in the limiter transfer function F(x, ΔE), and a limiter 64 calculates the transfer function F(x, ΔE) prevailing when the variable x is input, i.e., calculates the transfer function of Equation (32). A multiplier 65 multiplies this by $w_1$ (=1), outputs $$\ln \cosh\left\{\frac{A-B}{2}\right\} - \ln \cosh\left\{\frac{C-D}{2}\right\}$$

and corrects the soft-decision target value $\ln D_0$ on the subchannel of interest. That is, the multiplier 61 multiplies a $S_0+S_1+S_2+S_3$ (=$4 \cdot \alpha_1$) signal, which is the result of eliminating the time dependence of $S_0(t)+S_1(t)-S_2(t)-S_3(t)$, by the receive signal y(t). More specifically, the multiplier 61 multiplies a signal, in which the coupling $2 \cdot \alpha_2$ between the subchannel $ch_1$ and the subchannel of interest is adopted as $R_2$, by the receive signal y(t), and the integrator 62 integrates the result of multiplication and outputs the correlation between the signal $R_2$ and the receive signal y(t). A value obtained by combining this correlation and the soft-decision target value $LnD_1$ that has entered from the receiver on subchannel $ch_1$ is input to the limiter 63 as x, and the limiter 63 outputs f(x, ΔE). Based upon f(x, ΔE), the soft-decision target value $\ln D_0$ on subchannel $ch_0$ of interest that is output from the integrator 52 is corrected.

In view of the foregoing, by combining FIGS. 6 and 7, the decision equation of Equation (26) can be calculated by a decision-equation calculation unit 100 shown in FIG. 8. Components in FIG. 8 identical with those shown in FIGS. 6 and 7 are designated by like reference characters. An adder 66 in the decision-equation calculation unit 100

$$\text{adds } \frac{A+B}{2} - \frac{C+D}{2} \text{ and } \ln \cosh\left\{\frac{A-B}{2}\right\} - \ln \cosh\left\{\frac{C-D}{2}\right\}$$

and outputs $\ln D_0$. A discrimination unit 101 discriminates the symbol $D_0$ in accordance with the sign of $\ln D_0$.

The receive-data demodulation algorithm of the present invention described above resembles a turbo decoder of turbo code set forth in the following reference:

M. C. Valeniti and B. D. Woerner, "Variable latency turbo codes for wireless multimedia applications," Proc, Int. Symposium on Turbo codes and Related Topics., Brest, France, Sept. 1997, pp. 216-219.

Owing to the similarity with a turbo decoder, the algorithm of the present invention is referred to as a turbo receiver. In a turbo decoder, each decoder delivers information to other decoders and refines the a posteriori probabilities, which have been estimated in order, using information derived by the other decoders. Similarly, in the algorithm of the present invention, information derived from subchannels $ch_1$ and $ch_2$ is used to refine the estimated a posteriori probabilities of the subchannel $ch_0$ of interest after non-linear processing. If the individual decoder outputs in the turbo decoder have the form of a hard bit decision (hard decision), then the sharing of information is only marginally advantageous. A hard bit decision is similar to the well-known decision feedback equalizer (DFE) that has been proposed in order to cancel ICI. However, the output of the turbo decoder has the form of a soft decision. Similarly, the outputs $\ln D_0$, $\ln D_1$, $\ln D_2$ of the receiving devices on the subchannels in the present invention are values having the form of a soft decision (soft-decision target values), and a hard decision is rendered at the end of iteration.

The reason for these structural similarities is as follows: In a turbo receiver, the same information is transmitted on subchannels having uncorrelated noise owing to the existence of ICI, in a manner similar to that of turbo code. Depending upon the behavior of this uncorrelated noise, it is possible to improve upon the estimation of a posteriori probability (or decision reliability) by using the estimated a posteriori probabilities derived from the other subchannels $ch_1$, $ch_2$.

In a manner similar to that of an iterative turbo decoder, the algorithm of the present invention is repeatedly executed one or more times with regard to information received before the final decision is rendered. If the data is uniformly distributed probability variables at the initial step, namely when decisions from other channels cannot be utilized, then $$P(D_i=+1/y(t))=P(D_i=-1/y(t))=\tfrac{1}{2}, \; i=1, 2$$

can be set for the initial subchannel. This setting is the best setting. In the first step, therefore, it is assumed that the differences $\ln D_1$, $\ln D_2$ between the a posteriori probabilities on the subchannels $ch_1$, $ch_2$ are zero. By performing the calculations of Equations (28), (32) letting $LnD_1=lnDn_2=0$ hold, it is possible to obtain an initial estimate of $\ln D_0$, which was unknown.

(B) In Case of N Subchannels that Inflict Crosstalk

The foregoing relates to a case where ICI from two subchannels $ch_1$, $ch_2$ is imposed upon the subchannel $ch_0$ of interest (n=2). In a case where n=1 holds, the decision equation $\ln D_0$ is given by the following equation in a manner similar to that when n=2 holds:

$$\ln D_0 = 2 \cdot \frac{2}{N_0} \int_0^T y(t) dt + \quad (33)$$
$$\ln\cosh\left\{\frac{1}{2}\left[\ln D_1 + \frac{2}{N_0}\int_0^T y(t) \cdot 4 \cdot \alpha_1 dt - \frac{E_0 - E_1}{N_0}\right]\right\} -$$
$$\ln\cosh\left\{\frac{1}{2}\left[\ln D_1 + \frac{2}{N_0}\int_0^T y(t) \cdot 4 \cdot \alpha_1 dt + \frac{E_0 - E_1}{N_0}\right]\right\}$$

Equation (33) can be calculated by an arrangement obtained by eliminating the multiplier 53, integrator 54, adder 55, limiter 56, multiplier 57 and adder 58 from the decision-equation calculation unit 100 of FIG. 8. In other words, the decision-equation calculation unit 100 for n=2 can be implemented by adding the multiplier 53, integrator 54, adder 55, limiter 56, multiplier 57 and adder 58 to a decision-equation calculation unit for n=1. An expansion to n=N can be made through a similar approach.

FIG. 9 is a block diagram of the overall configuration of a communication system when n=N is assumed to hold. The system has (N+1) transmitting devices $11_0$, $11_1$, $11_2$, ... $11_N$ for transmitting data independently over (N+1) subchannels $ch_0$, $ch_1$, $ch_2$, ... $ch_N$, respectively; (N+1) receiving devices (only receiving device $12_0$ on subchannel $ch_0$ of interest is illustrated), which are provided on respective ones of the subchannels, for receiving data from the corresponding subchannels and rendering a soft decision regarding the receive data; crosstalk paths $13_1$ to $13_N$ having coupling coefficients $\alpha_{1,0}$ to $\alpha_{N,0}$ of coupling from the first to Nth subchannels $ch_1$ to $ch_N$ to the subchannel $ch_0$ of interest; the noise source 14; and receive lines $15_1$ to $15_N$ for inputting soft-decision target values $\ln D_1$ to $\ln D_N$ on the first to Nth subchannels $ch_1$ to $ch_N$ to the receiving device $12_0$. Furthermore, reference characters $16_1$ to $16_N$ denote combiners for adding crosstalk signals, which are from the first to Nth subchannels $ch_1$ to $ch_N$ to the subchannel $ch_0$ of interest, to the subchannel signal of interest, and reference character 17 denotes a combiner for adding noise.

FIG. 10 is a block diagram of a decision-equation calculation unit of the present invention in a case where n=N holds. If it is assumed that N=2 holds, the structure will be the same as that shown in FIG. 8. The decision-equation calculation unit 100 for n=N can be constructed by adding a multiplier 81, integrator 82, adder 83, limiter 84, multiplier 85 and adder 86 to the structure of a decision-equation calculation unit for n =N−1. However, the following holds:

$$R_0 = 2$$ (34)
$$R_1 = 2 \cdot \alpha_{N,0} = 2 \cdot \alpha_N$$
$$R_2 = 2 \cdot \alpha_{N-1,0} = 2 \cdot \alpha_{N-1}$$
$$\ldots$$
$$R_{N-1} = 2 \cdot \alpha_{2,0} = 2 \cdot \alpha_2$$
$$R_N = 2 \cdot \alpha_{1,0} = 2 \cdot \alpha_1$$

and a scaling factor $W_n$ is as follows:

$$w_n = \frac{1}{2}^{n-1} \ (n=1 \text{ to } N)$$ (35)

Further, a limit level $Lim_n$ is given by the following equation:

$$Lim_n = 2^{n-1} \cdot 4 \cdot \alpha_n \ (n=1 \text{ to } N)$$ (36)

(C) Application to DMT Systems

An M-subchannel DMT-based communication system is considered as an application of the turbo receiver of the present invention. FIG. 11 is a block diagram of the overall configuration of such a DMT-based communication system that employs turbo receivers. This system has a configuration in which turbo receivers of the present invention are placed as the succeeding stage of an FFT unit of a receiver in a well-known DMT communication system.

In the communication system of FIG. 11, a serial-to-parallel converter (S/P) 501 converts an input bit stream of data rate R (bits/sec: bps) to M-bit parallel data and transfers each bit via M-number of parallel subchannels at a new rate R/M (bps). An M-point IFFT 502 combines the M items of parallel data and converts it to a time-domain sample signal. A parallel-to-serial converter (P/S) 503 converts these N samples to a serial format and inputs the results to a digital-to-analog converter (DAC) 504 successively. The output signal of a low-pass filter (LPF) 505 on the DAC output side is a continuous-time signal DMT. The transmit DMT signal on the white Gaussian noise channel is degraded by white Gaussian noise n(t) and is sent to a DMT receiver 600.

The receiver implements a function that is a reverse of that of the transmitter. That is, an analog-to-digital converter (ADC) 506 subjects the receive signal to an analog-to-digital conversion, and a parallel-to-serial converter (S/P) 507 converts the digital signal to M items of parallel data and inputs the data to an FFT 508. The latter executes FFT processing and subjects the signals sent on each of the subchannels to demodulation processing as an M-matched filter array. Turbo receivers (turbo equalizers) $509_1$ to $509_M$ of the present invention execute data decision processing of subchannels based upon a turbo algorithm, and a serial-to-parallel converter (P/S) 510 converts the signals obtained by each of the turbo receivers to serial data and outputs the data as detection data. In view of the foregoing, the BER can be improved even if a frequency offset exists.

FIG. 12 illustrates the BER performance (MF) of a conventional DMT-based receiver as well as the BER performance of a DMT receiver, which has the turbo processing function of the present invention, for performing six turbo iterations on M (=64) subchannels. BER performance is indicated versus 2Eb/No, with 25% being the frequency offset equalized at the frequency between channels. Further, BER under ideal conditions in which ICI does not occur is indicated as REF.

In accordance with the present invention, the BER is improved greatly, as obvious from FIG. 12. In accordance with the turbo algorithm of the present invention, BER can be improved whenever the number of crossover paths (the number of crosstalk channels) increases. In a simulation, a reference number Rn is calculated according to Equation (34), the scaling factor $w_n$ is calculated according to Equation (35), and a decision-equation calculation unit is constructed using an amplification limiter having a limit level $Lim_n$ calculation according to Equation (36).

FIG. 13 illustrates BER-performance comparison characteristics of a system that employs a conventional DFE equalizer and a system that uses the turbo equalizer of the present invention. The turbo equalizer of the present invention has a far superior BER characteristic.

Effects

The present invention contributes to an improvement in performance and makes it possible to implement a turbo receiver in simple fashion even if the number of subchannels to be considered is increased.

Further, in accordance with the present invention, performance can be improved by increasing the number of subchannels and this can be implemented by a simple arrangement even if the number of subchannels is increased.

What is claimed is:

1. A receiving apparatus in a multicarrier communication system for transmitting data independently via a plurality of subchannels, characterized by comprising:

soft-decision target value output means for adjusting and outputting a soft-decision target value, which is the difference between the probability that data received from a subchannel of interest is one of two values and the probability that the data is the other of the two values, using soft-decision target values that have entered from receivers on other subchannels; and a decision unit for rendering a decision on receive data based upon said soft-decision target value that has been adjusted;

wherein said soft-decision target value output means includes:

means for calculating a soft-decision target value, which is the difference between the probability that data received from a subchannel of interest is one of two values and the probability that the data is the other of the two values; and soft-decision target value adjusting means for performing a non-linear operation using degrees of coupling with other subchannels and soft-decision target values that have entered from receivers on said other subchannels, and adjusting the soft-decision target value on said subchannel of interest subchannel by subchannel based upon results of said non-linear operation.

2. A receiving apparatus according to claim 1, characterized in that said soft-decision target value adjusting means includes:

a non-linear calculation unit for calculating correlation between reference signals, which conform to degrees of coupling $\alpha_i$ between said other subchannels and the subchannel of interest, and a receive signal y(t) from the subchannel of interest, and adopting as an input variable a value obtained by combining this correlation and the soft-decision target values $\ln D_i$ that have entered from the receivers on said other subchannels; and an adjusting unit for adjusting the soft-decision target value on the subchannel of interest based upon each of the output signals of said non-linear calculation units on the other subchannels, wherein i and t are integers.

3. A receiving apparatus according to claim 2, characterized in that said non-linear calculation unit is an amplification limiter to which said combined value is input.

4. A receiving apparatus according to claim 3, characterized in that a multiplier for multiplying an output of said limiter by a scaling factor is provided in a stage succeeding said each limiter.

5. A receiving apparatus according to claim 3, characterized in that a limit level of an amplification limiter of an nth subchannel is $2^{n-1} \cdot 4 \cdot \alpha_n$, wherein n is an integer.

6. A receiving apparatus according to claim 4, characterized in that the scaling factor that multiplies the output of the amplification limit of said nth subchannel is $\frac{1}{2}^{n-1}$, wherein n is an integer.

7. A receiving method in a multicarrier communication system for transmitting data independently via a plurality of subchannels, characterized by:

calculating a soft-decision target value, which is the difference between the probability that data received from a subchannel of interest is one of two values and the probability that the data is the other of the two values;

performing a non-linear operation using degrees of coupling with other subchannels and soft-decision target values that have entered from receivers on said other subchannels, and adjusting the soft-decision target value on said subchannel of interest subchannel by subchannel based upon results of said non-linear operation; and rendering a decision on receive data based upon said soft-decision target value that has been adjusted.

8. A receiving method according to claim 7, characterized in that said step of adjusting the soft-decision target value includes:

calculating correlation between reference signals, which conform to degrees of coupling $\alpha_i$, between said other subchannels and the subchannel of interest, and a receive signal y(t) from the subchannel of interest, combining this correlation and soft-decision target values $\ln D_i$ that have entered from receivers on said other subchannels, and performing a non-linear operation with the combined value serving as an input;

wherein said step of adjusting the soft-decision target value adjusts the soft-decision target value on said subchannel of interest based upon results of the non-linear operation on each of said subchannels, and wherein i and t are integers.

9. A receiving method according to claim 8, characterized in that said non-linear operation is a limiter operation in which said combined value is an input.

10. A receiving method according to claim 9, characterized in that an amplification limiter output is multiplied by a scaling factor after said limiter operation.

* * * * *